(12) United States Patent
Saito et al.

(10) Patent No.: US 9,403,526 B2
(45) Date of Patent: Aug. 2, 2016

(54) ELECTRICALLY DRIVEN DUMP TRUCK

(75) Inventors: Shinjiro Saito, Kasumigaura (JP);
Kichio Nakajima, Isesaki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 160 days.

(21) Appl. No.: 14/123,911

(22) PCT Filed: Jun. 11, 2012

(86) PCT No.: PCT/JP2012/064868
§ 371 (c)(1),
(2), (4) Date: Dec. 4, 2013

(87) PCT Pub. No.: WO2013/005528
PCT Pub. Date: Jan. 10, 2013

(65) Prior Publication Data
US 2014/0095006 A1    Apr. 3, 2014

(30) Foreign Application Priority Data

Jul. 4, 2011    (JP) .................................. 2011-148709

(51) Int. Cl.
*B60W 10/20*        (2006.01)
*B60L 5/08*         (2006.01)
(Continued)

(52) U.S. Cl.
CPC ................ *B60W 10/20* (2013.01); *B60L 1/003* (2013.01); *B60L 5/045* (2013.01); *B60L 5/36* (2013.01); *B60L 9/18* (2013.01); *B60L 11/123* (2013.01);
(Continued)

(58) Field of Classification Search
CPC .............. B60L 5/045; B60L 9/18; B60L 9/24
See application file for complete search history.

(56) References Cited

U.S. PATENT DOCUMENTS 4,424,875 A  *  1/1984  Yoshida ........................ 180/168
4,483,148 A     11/1984  Minami
(Continued)

FOREIGN PATENT DOCUMENTS

JP      62-023302 A      1/1987
JP      05278502 A   *  10/1993
(Continued)

OTHER PUBLICATIONS

International Search Report issued in corresponding application No. PCT/JP2012/064868 on Sep. 18, 2012.

*Primary Examiner* — Mussa A Shaawat
*Assistant Examiner* — Kyung Kim
(74) *Attorney, Agent, or Firm* — Brundidge & Stanger, P.C.

(57) ABSTRACT

A vehicle control device 50, a controller 100, an inverter control device 30 and a steering control device 32 constitute a control device that executes control to give a yaw moment to a vehicle 1 so as to make the vehicle 1 travel while meandering around the center of trolley wires 3R and 3L based on image information acquired by a camera 15. The control device converts an image acquired by the camera 15 into coordinate information, calculates at least one representative point of the vehicle 1 and at least one target point situated on the trolley wire 3R/3L based on the coordinate information, sets a fluctuating point which fluctuates with reference to the target point, and executes control to give a yaw moment to the vehicle 1 so that the representative point approaches the fluctuating point. With this configuration, uneven wear of the sliders can be prevented and the operating load on the driver during the trolley traveling can be lightened considerably.

7 Claims, 48 Drawing Sheets

(51) Int. Cl.
  *B60L 9/18* (2006.01)
  *B60L 5/04* (2006.01)
  *B60L 5/36* (2006.01)
  *B60L 1/00* (2006.01)
  *B60L 11/12* (2006.01)
  *B60L 11/18* (2006.01)
  *B60L 15/20* (2006.01)

(52) U.S. Cl.
  CPC ......... *B60L 11/1827* (2013.01); *B60L 15/2036* (2013.01); *B60L 15/2045* (2013.01); *B60L 5/08* (2013.01); *B60L 2200/36* (2013.01); *B60L 2220/44* (2013.01); *B60L 2240/12* (2013.01); *B60L 2240/16* (2013.01); *B60L 2240/18* (2013.01); *B60L 2240/20* (2013.01); *B60L 2240/22* (2013.01); *B60L 2240/24* (2013.01); *B60L 2240/421* (2013.01); *B60L 2240/423* (2013.01); *B60L 2240/441* (2013.01); *B60L 2240/443* (2013.01); *B60L 2240/461* (2013.01); *Y02T 10/6217* (2013.01); *Y02T 10/645* (2013.01); *Y02T 10/7005* (2013.01); *Y02T 10/7072* (2013.01); *Y02T 10/7077* (2013.01); *Y02T 10/7283* (2013.01); *Y02T 90/121* (2013.01); *Y02T 90/125* (2013.01); *Y02T 90/14* (2013.01)

(56) References Cited

U.S. PATENT DOCUMENTS

| 4,694,125 | A | 9/1987 | Takei et al. |
|---|---|---|---|
| 2002/0053479 | A1 | 5/2002 | Wakitani et al. |

FOREIGN PATENT DOCUMENTS

| JP | 11-098604 A | 4/1999 |
|---|---|---|
| JP | 2002-326580 A | 11/2002 |
| JP | 2007-076516 A | 3/2007 |
| JP | 2009-040215 A | 2/2009 |
| JP | 2011-078310 A | 4/2011 |

* cited by examiner

ELECTRICALLY DRIVEN DUMP TRUCK

TECHNICAL FIELD

The present invention relates to an electrically driven dump truck. In particular, to an electrically driven dump truck which travels by using electric power from trolley wires.

BACKGROUND ART

Some types of dump trucks that travel in mines are known as the series hybrid type. Such series hybrid type dump trucks generate electric power with a generator driven by the engine and supply the electric power to rear wheel motors for driving the rear wheels. By taking advantage of the electrical configuration of the series hybrid type, traveling technology based on the trolley system has been implemented. In the trolley-based traveling technology, trolley wires generally employed for electric trains are installed in prescribed climbing sections. In the climbing sections with trolley wires, a vehicle having power collectors (provided on the vehicle to be movable up and down) travels not by using the electric power supplied by the engine and the generator but by using electric power acquired from the trolley wires by elevating sliders of the power collectors to be in contact with the trolley wires (hereinafter referred to as "trolley traveling"). An example of the trolley-based traveling technology has been described in Patent Literature 1, for example. In this case, the drop in the traveling speed in the climbing sections (equipped with the trolley wires enabling the trolley traveling) can be avoided since the electric power supplied from the trolley wires is greater than the electric power generated with the engine power.

PRIOR ART LITERATURE

Patent Literature

Patent Literature 1: U.S. Pat. No. 4,483,148

SUMMARY OF THE INVENTION

Problem to be Solved by the Invention

In a trolley-based dump truck like the one described in the Patent Literature 1, the driver during the trolley traveling steers the dump truck while viewing the trolley wires so that the dump truck travels along the trolley wires. In this case, the position of the contact point between each slider and the corresponding trolley wire can concentrate around the center of the slider. Since each slider is small compared to the size of the dump truck, it is extremely difficult for the driver (even if being capable of performing the steering to place the trolley wires around the centers of the sliders) to take care also about the uneven wear of the sliders. As a result, the operating load on the driver increases. Such uneven wear of the sliders and concentration of heating due to the uneven wear lead to shortening of the life of the sliders, breakage of a slider, or breakage of a trolley wire due to the breakage of the slider.

It is therefore the primary object of the present invention to provide an electrically driven dump truck capable preventing the uneven wear of the sliders and lightening the operating load on the driver during the trolley traveling.

Means for Solving the Problem

To achieve the above object, an invention described in claim 1 provides an electrically driven dump truck which elevates a slider of a power collector provided on a vehicle to be movable up and down, places the slider in contact with a trolley wire installed along a lane, and travels by use of electric power received from the trolley wire, comprising: right and left electric motors for traveling; a steering device; a trolley wire detecting device which is provided on the vehicle and detects the trolley wire from below when the electrically driven dump truck is traveling; and a control device which executes control to give a yaw moment to the vehicle so as to make the vehicle travel while meandering around the trolley wire based on relative position information on the electrically driven dump truck and the trolley wire detected by the trolley wire detecting device. The control device includes a vehicle control device, a controller, an inverter control device and a steering control device. The vehicle control device calculates a yaw moment correction value for giving the yaw moment to the vehicle. The controller controls at least either the right and left electric motors or the steering device by use of the inverter control device and the steering control device based on the yaw moment correction value.

In the electrically driven dump truck configured as above, the trolley wire is detected from below and a yaw moment for making the vehicle oscillate in the direction orthogonal to the traveling direction is given to the vehicle to carry out vehicle meandering control. Thanks to this control, the vehicle travels while meandering around the trolley wire, the contact point between the slider and the trolley wire is prevented from concentrating at/around the center of the slider, and the driver is allowed to drive the dump truck while having the slider make even contact with the trolley wire. Consequently, the uneven wear of the slider can be prevented without requiring the driver to be careful about the uneven wear and the operating load on the driver can be lightened considerably. Further, the yaw moment control can be executed by using the vehicle control device and the controller as separate components. With this configuration, even when the controller is an already-existing controller, the yaw moment control in accordance with the present invention can be carried out by just adding the vehicle control device to the controller. The parameters of the yaw moment control can be adjusted just by changing the functions of the vehicle control device. Consequently, high flexibility can be given to the control system.

In an invention described in claim 2, in the electrically driven dump truck according to claim 1, the control device calculates at least one representative point of the vehicle and at least one target point situated on the trolley wire based on the relative position information on the electrically driven dump truck and the trolley wire detected by the trolley wire detecting device, sets a fluctuating point which fluctuates with reference to the target point, and executes control to give a yaw moment to the vehicle so that the representative point approaches the fluctuating point.

With this configuration, the vehicle is allowed to travel while meandering around the trolley wire with high accuracy, by which the uneven wear of the slider can be prevented more precisely.

In an invention described in claim 3, the electrically driven dump truck according to claim 2 further comprises a vehicle speed detecting device which measures speed of the vehicle. The control device makes the fluctuating point periodically fluctuate at a certain cycle determined according to at least either a previously memorized distance of a section for performing trolley traveling or the vehicle speed measured by the vehicle speed detecting device.

With this configuration, the even contact between the slider and the trolley wire can be achieved appropriately based on the status of the trolley traveling section or the vehicle, by which the uneven wear of the slider can be prevented with high reliability.

In an invention described in claim 4, in the electrically driven dump truck according to claim 3, the control device makes the fluctuating point periodically fluctuate at a certain cycle determined according to one selected from a sinusoidal wave function, a trapezoidal wave function and a triangular wave function corresponding to at least either the trolley traveling section distance or the vehicle speed.

With this configuration, periodical and evener contact of the slider with the trolley wire can be achieved, by which the uneven wear of the slider can be prevented with higher reliability.

In an invention described in claim 5, in the electrically driven dump truck according to claim 3, the control device in the control for making the fluctuating point periodically fluctuate makes the fluctuating point fluctuate for at least a half cycle or more during the traveling of the electrically driven dump truck through the trolley traveling section.

With this configuration, the meandering control is carried out at least for a half cycle or more in the trolley traveling section, by which the occurrence of a part of the slider not making contact with the trolley wire (caused by insufficiency of the cycle) can be suppressed reliably, evener contact between the slider and the trolley wire can be realized, and the uneven wear of the slider can be prevented with higher reliability.

In an invention described in claim 6, the electrically driven dump truck according to claim 2 further comprises: an angle sensor which measures at least either a steering angle of a steering wheel operated by a driver or a steerage angle of tires; and a yaw rate detecting device which measures a yaw rate of the vehicle. The control device judges whether the vehicle is traveling in a straight traveling section or not based on whether or not the steering angle or the steerage angle measured by the angle sensor or the yaw rate measured by the yaw rate detecting device remains not more than a prescribed value for a prescribed time period. The control device sets the fluctuating point when the vehicle is judged to be traveling in the straight traveling section.

With this configuration, whether the vehicle is traveling in a straight traveling section or not can be judged with ease and the meandering control is executed in sections in which the trolley wire is installed straight. This allows the vehicle to stably travel while meandering around the trolley wire.

In an invention described in claim 7, in the electrically driven dump truck according to claim 2, the control device memorizes the number of times of traveling through the trolley traveling section and inverts the direction of the fluctuation of the fluctuating point upon each traveling through the trolley traveling section based on the number of times of traveling.

With this configuration, even when the length of the trolley traveling section is not long enough to include a cycle of the fluctuation, the direction of the amplitude at the start of the meandering control is switched, by which the problem (uneven wearing of only one side of the slider) can be resolved with ease and reliability.

In an invention described in claim 8, in the electrically driven dump truck according to claim 1 or 2, the trolley wire detecting device includes: a camera which is provided on the vehicle and continuously captures images of the trolley wire when the dump truck is traveling; and an illuminating device which is provided on the vehicle and illuminates the trolley wire.

Even when a camera is employed for the trolley wire detecting device as above, illuminating the trolley wire with the illuminating device keeps high contrast between the sky and the trolley wire. Consequently, yaw moment control with which the vehicle travels while meandering around the trolley wire can be executed with high accuracy not only in the daytime with fine weather but also in conditions in which such high contrast between the sky and the trolley wire is hardly achieved (evening, nighttime, rainy weather, etc.).

Effect of the Invention

According to the electrically driven dump truck in accordance with the present invention, the uneven wear of the sliders can be prevented and the operating load on the driver during the trolley traveling can be lightened.

MODE FOR CARRYING OUT THE INVENTION

Figure 1:
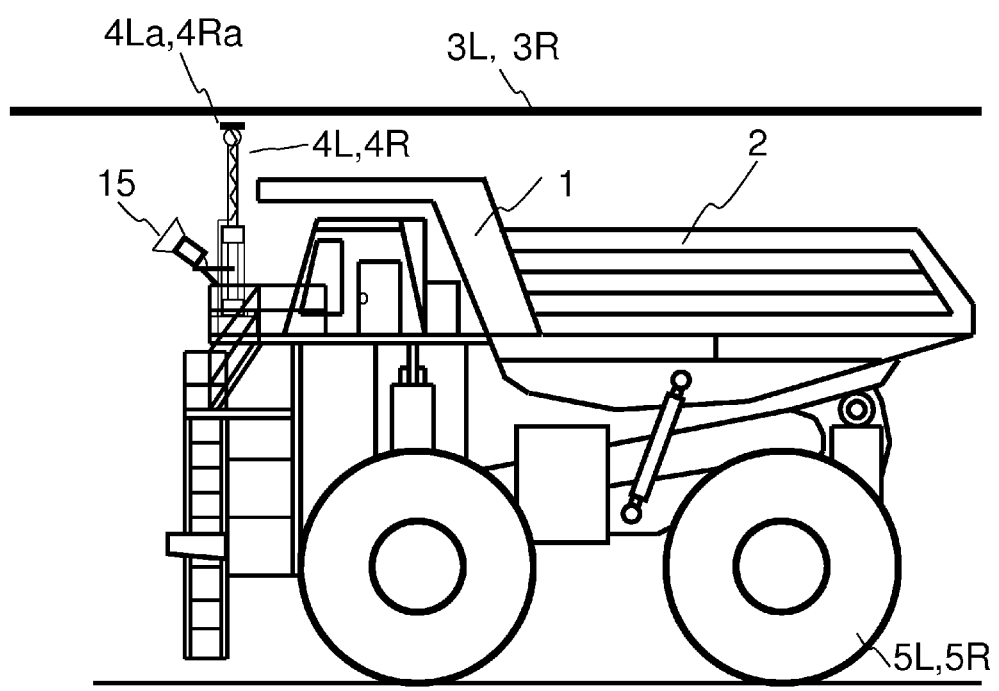
FIG. 1 is a side view showing the external appearance of an electrically driven dump truck in accordance with an embodiment of the present invention.

Referring now to the drawings, a description will be given in detail of a preferred embodiment in accordance with the present invention.

<Configuration of Vehicle—Dump Truck>

FIG. 1 is a side view showing the external appearance of an electrically driven dump truck in accordance with an embodiment of the present invention.

In FIG. 1, the dump truck comprises a vehicle 1, a vessel 2 for carrying earth, sand, etc., right and left power collectors 4R and 4L for collecting electric power, and right and left rear wheels (tires) 5R and 5L driven by the electric power collected by the power collectors 4R and 4L. The right and left power collectors 4R and 4L are equipped with sliders 4Ra and 4La which are movable up and down to receive the electric power from two (right and left) trolley wires 3R and 3L. One of the trolley wires 3R and 3L is at a high voltage and the other is grounded. The power collectors 4R and 4L are provided on a front part of the vehicle 1. The dump truck is equipped with a trolley wire detecting device 15 mounted on the front part of the vehicle 1. The trolley wire detecting device 15 continuously detects the trolley wires 3R and 3L in front of the dump truck when the dump truck is traveling. The trolley wire detecting device 15 is a device newly mounted on the dump truck according to the present invention. While the trolley wire detecting device 15 is mounted on the front part of the vehicle 1 in the illustrated example, the trolley wire detecting device 15 may also be arranged differently (e.g., on the roof of the vehicle 1).

Figure 2:
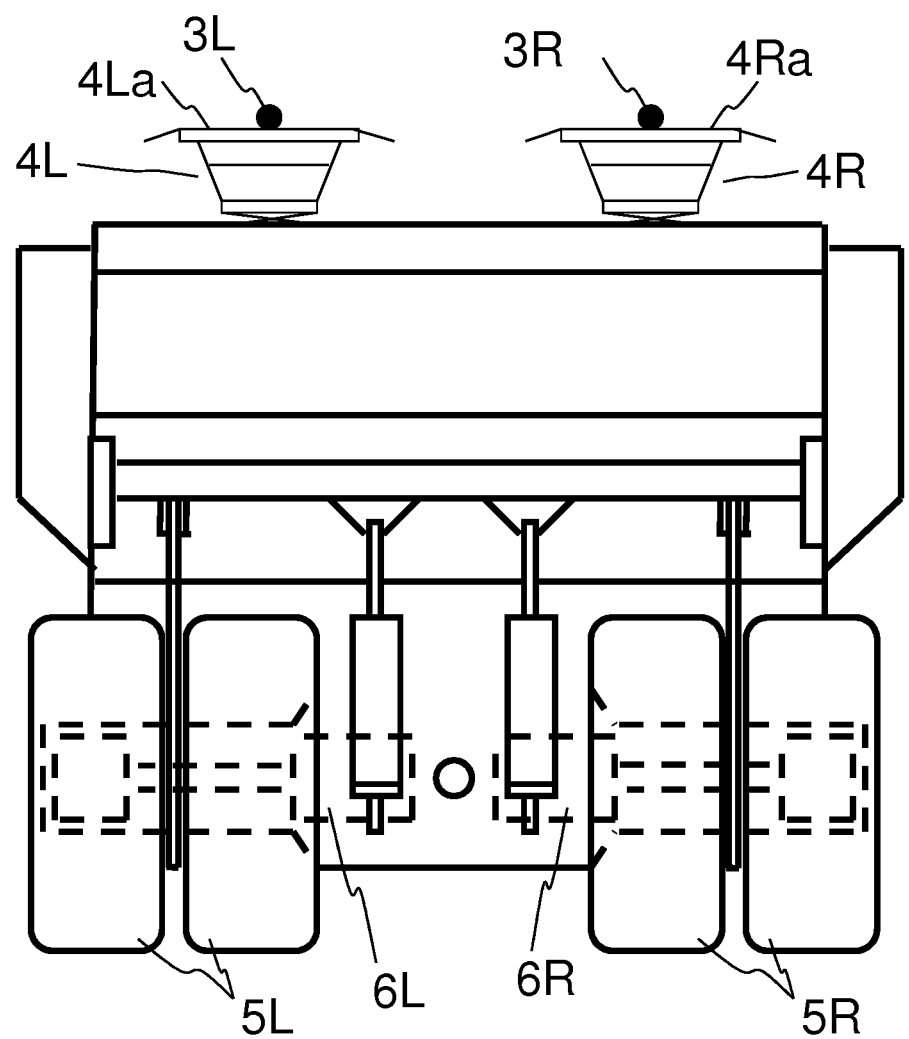
FIG. 2 is a rear view showing the external appearance of the dump truck.

FIG. 2 is a rear view showing the external appearance of the dump truck. Each rear wheel 5R, 5L is formed as a double-tire wheel to endure the load of earth, sand, etc. loaded on the vessel 2. The right and left double-tire wheels 5R and 5L are driven and braked by right and left electric motors 6R and 6L (e.g., induction motors).

Figure 3:
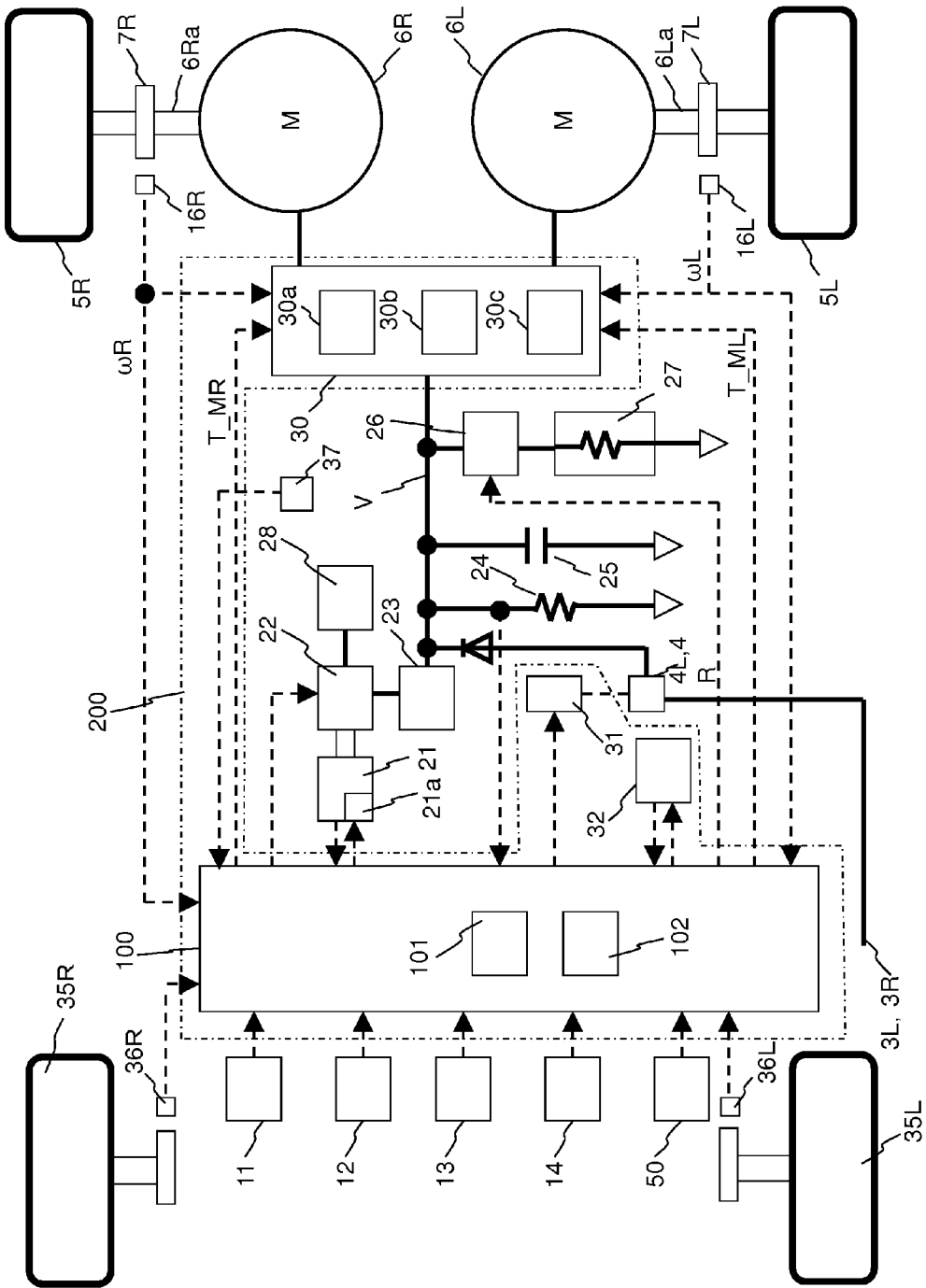
FIG. 3 is a schematic block diagram showing a drive system of the electrically driven dump truck in this embodiment.

FIG. 3 shows a drive system of the electrically driven dump truck of this embodiment. In FIG. 3, the drive system of the electrically driven dump truck includes an accelerator pedal 11, a retarder pedal 12, a shift lever 13, a combined sensor 14, an engine 21, an AC generator 22, the other engine load 28, a rectifier circuit 23, a sensing resistor 24, a capacitor 25, a chopper circuit 26, a grid resistor 27, the power collectors 4R and 4L, the rear wheels 5R and 5L, the electric motors 6R and 6L, decelerators 7R and 7L, electromagnetic pickup sensors 16R and 16L, and a control device 200. The combined sensor 14 is used as a yaw rate detecting device for sensing the forward/backward acceleration, the lateral acceleration and the yaw rate. The decelerators 7R and 7L are connected to output shafts 6Ra and 6La of the electric motors 6R and 6L, respectively. Electromagnetic pickup sensors 16R and 16L measure the wheel speeds of the right and left rear wheels, respectively. Similarly to the rear wheels 5R and 5L, the right and left front wheels 35R and 35L are equipped with electromagnetic pickup sensors 36R and 36L for measuring their wheel speeds. The right and left front wheel speeds are measured by the electromagnetic pickup sensors 36R and 36L, respectively. Incidentally, the rear wheels 5R and 5L are not suitable for the measurement of the vehicle speed in the strict sense (although there is no problem in most cases) since the rear wheels 5R and 5L are driving wheels and their tires are deformed due to the driving and the braking. Since the front wheels as driven wheels are less affected by the driving/braking, it can be said that vehicle speed calculation by use of the measurements by the electromagnetic pickup sensors 36R and 36L is more precise and gives a value closer to the actual vehicle speed. In cases of controlling the vehicle movement, however, it is sometimes more appropriate to discuss the ground speed of the barycenter of the vehicle 1 (vehicle speed) rather than discussing the front wheel speeds or the rear wheel speeds. Therefore, it is also possible to equip the dump truck with a sensor for directly measuring the ground speed (e.g., ground speed sensor 37) and use the sensor for the measurement of the vehicle speed. Such a sensor can generally be implemented by a millimeter wave radar sensor, an optical sensor, etc.

The control device 200 includes an inverter control device 30, an elevation control device 31, a steering control device 32, a vehicle control device 50 and a controller 100. The inverter control device 30 controls the electric motors 6R and 6L according to torque commands inputted thereto. The elevation control device 31 moves the sliders 4Ra and 4La of the power collectors 4R and 4L up and down according to button operations by the driver or inputs from the outside. The steering control device 32 converts the driver's steering operation into an electric signal and thereby controls the steering of the front wheels. The vehicle control device 50 is a characteristic part of the present invention.

The inverter control device 30 includes a torque command calculation unit 30a, a motor control calculation unit 30b and an inverter (switching element) 30c (publicly-known configuration) for each of the right and left electric motors 6R and 6L. The power collectors 4R and 4L are equipped with elevators which move the sliders 4Ra and 4La up and down according to elevation command signals from the elevation control device 31. The details of the power collectors 4R and 4L, the elevation control device 31, the steering system (including the steering control device 32) and the vehicle control device 50 will be described later.

<Basic Operation Including Traveling>

The depressing level P (the degree of depressing) of the accelerator pedal 11 and the depressing level Q of the retarder pedal 12 are inputted to the controller 100 as signals for controlling the magnitude of the driving force and the retarding force (braking force), respectively. For example, when the driver depresses the accelerator pedal 11 to move the dump truck forward or backward, the controller 100 outputs a command regarding a target revolution speed Nr to the engine 21. The command regarding the target revolution speed Nr is outputted based on a preset table of target revolution speeds Nr corresponding to various accelerator angles. The engine 21 is a diesel engine equipped with an electronic governor 21a. Upon receiving the command regarding the target revolution speed Nr, the electronic governor 21a controls the fuel injection quantity so that the engine 21 revolves at the target revolution speed Nr.

The AC generator 22 is connected to the engine 21 to generate AC power. The electric power generated by the AC power generation is rectified by the rectifier circuit 23 and stored in the capacitor 25 (DC voltage: V). A voltage value detected by the sensing resistor 24 (dividing the DC voltage V at a certain ratio) is fed back to the controller 100. The AC generator 22 is controlled by the controller 100 receiving the feedback so that the voltage value equals a prescribed constant voltage V0.

The electric power generated by the AC generator 22 is supplied to the right and left electric motors 6R and 6L via the inverter control device 30. The controller 100 controls the supply of the necessary electric power to the electric motors 6R and 6L by controlling the AC generator 22 so that the DC voltage V acquired by the rectification by the rectifier circuit 23 equals the prescribed constant voltage V0. In contrast, when the sliders 4Ra and 4La of the power collectors 4R and 4L are in contact with the trolley wires 3R and 3L, the DC voltage V0 is directly supplied from the trolley wires 3R and 3L to the inverter control device 30.

The controller 100 calculates torque command values T_MR_a and T_ML_a corresponding to the operation amounts of the accelerator pedal 11 and the retarder pedal 12 and then generates and outputs torque command values T_MR and T_ML for the right and left electric motors 6R and 6L based on the torque command values T_MR_a and T_ML_a, torque command values T_MR_V and T_ML_V for vehicle speed control, and motor torque correction values T_MR_Y and T_ML_Y for yaw moment control (explained later). The torque command values T_MR and T_ML for the right and left electric motors 6R and 6L and the revolution speeds ωR and ωL of the electric motors 6R and 6L detected by the electromagnetic pickups 16R and 16L are inputted to the inverter control device 30. The inverter control device 30 drives each of the electric motors 6R and 6L via the torque command calculation unit 30a, the motor control calculation unit 30b and the inverter (switching element) 30c.

The right and left rear wheels (tires) 5R and 5L are connected to the electric motors 6R and 6L via the decelerators 7R and 7L, respectively. Each electromagnetic pickup 16R, 16L is generally implemented by a sensor which detects the peripheral speed of a cog of a gear inside the decelerator 7R, 7L. In the drive system for the right-hand side, for example, it is also possible to attach a gear for the detection to a drive shaft inside the electric motor 6R or to a drive shaft connecting the decelerator 7R to the wheel (tire) 5R and arrange the electromagnetic pickup 16R at the position of the gear.

When the driver of the traveling dump truck returns the accelerator pedal 11 and depresses the retarder pedal 12, the controller 100 executes control so that the AC generator 22 does not generate electric power. Further, the torque command values T_MR_a and T_ML_a from the controller 100 turn negative and thus the inverter control device 30 drives the electric motors 6R and 6L to give braking force to the traveling dump truck. In this case, the electric motors 6R and 6L function as generators so as to electrically charge the capacitor 25 by use of the rectification function of the inverter control device 30. The chopper circuit 26 operates to keep the DC voltage value V within a preset DC voltage value V1 while converting electric energy to thermal energy by feeding electric current to the grid resistor 27.

<Upward/Downward Movement of Sliders of Power Collectors>

Figure 4:
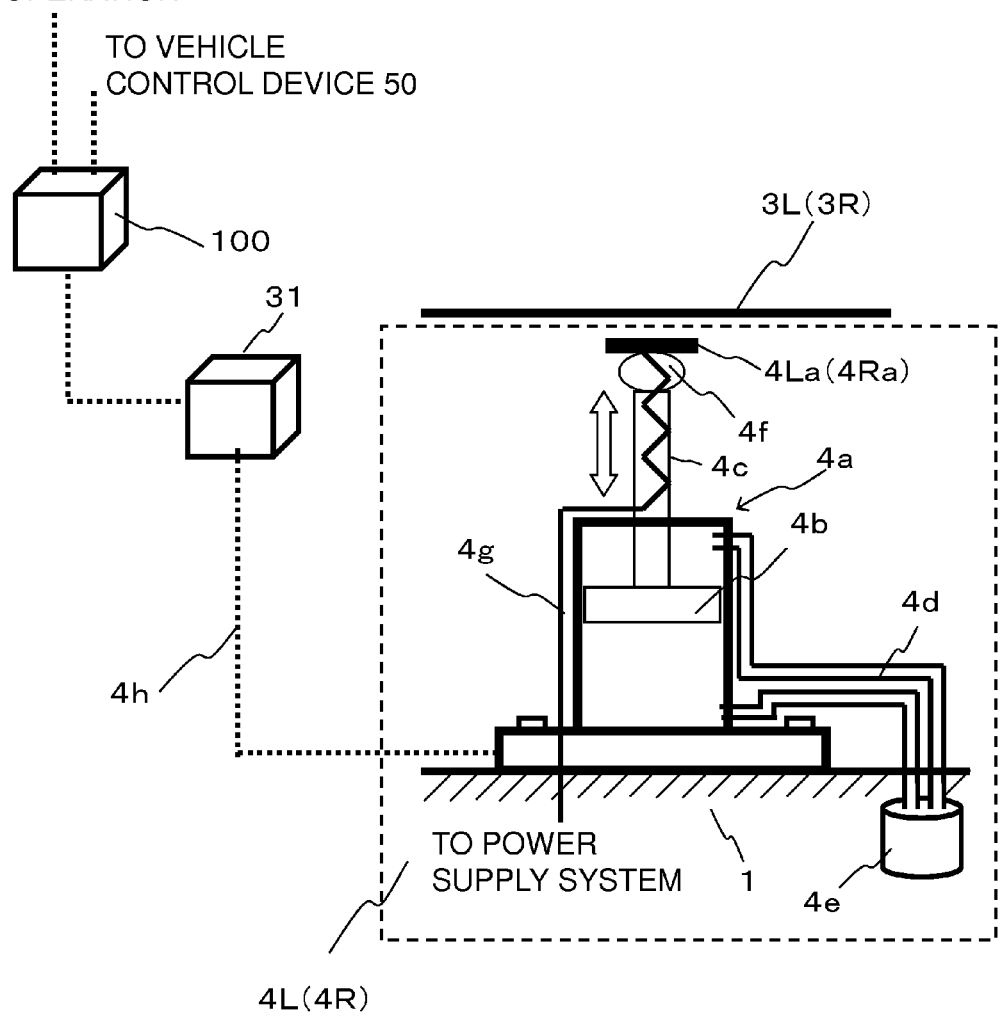
FIG. 4 is a schematic diagram showing the configuration of power collectors for receiving electric power from trolley wires.

Next, the elevators for the sliders 4Ra and 4La of the power collectors 4R and 4L will be explained below. FIG. 4 shows the configuration of the power collectors 4R and 4L for receiving the electric power from the trolley wires 3R and 3L. Since the power collectors 4R and 4L are identical with each other in the configuration, the configuration of the power collector 4L will be explained as a representative. The power collector 4L has a hydraulic piston device 4a as the elevator. The housing of the hydraulic piston device 4a is fixed on the vehicle 1. The slider 4La is attached to an end of a rod 4c of a hydraulic piston 4b of the hydraulic piston device 4a. The contact/detachment of the slider 4La to/from the trolley wire 3L is controlled by vertically moving the hydraulic piston 4b with hydraulic fluid supplied from a hydraulic device 4e (including a hydraulic pump) via a hydraulic line 4d. The slider 4La and the rod 4c of the hydraulic piston 4b are electrically insulated from each other by an insulator 4f. The electric power of the trolley wire 3L is supplied to a power supply system of the inverter control device 30 (for driving the motors, see FIG. 3) via the slider 4La and an electric wire 4g. The elevation control device 31 is configured to send the elevation command signal 4h to the hydraulic device 4e according to the driver's operation on an elevation switch or a switching (flag) operation or a control command signal from the outside (e.g., the vehicle control device 50 of the present invention). While the elevator for the slider 4La is implemented by the hydraulic piston device 4a in this embodiment, the elevator may of course be implemented by the system called "pantograph" by use of parallel linkage, spring, motor, etc. as is generally employed for electric trains.

<Steering System>

Figure 5:
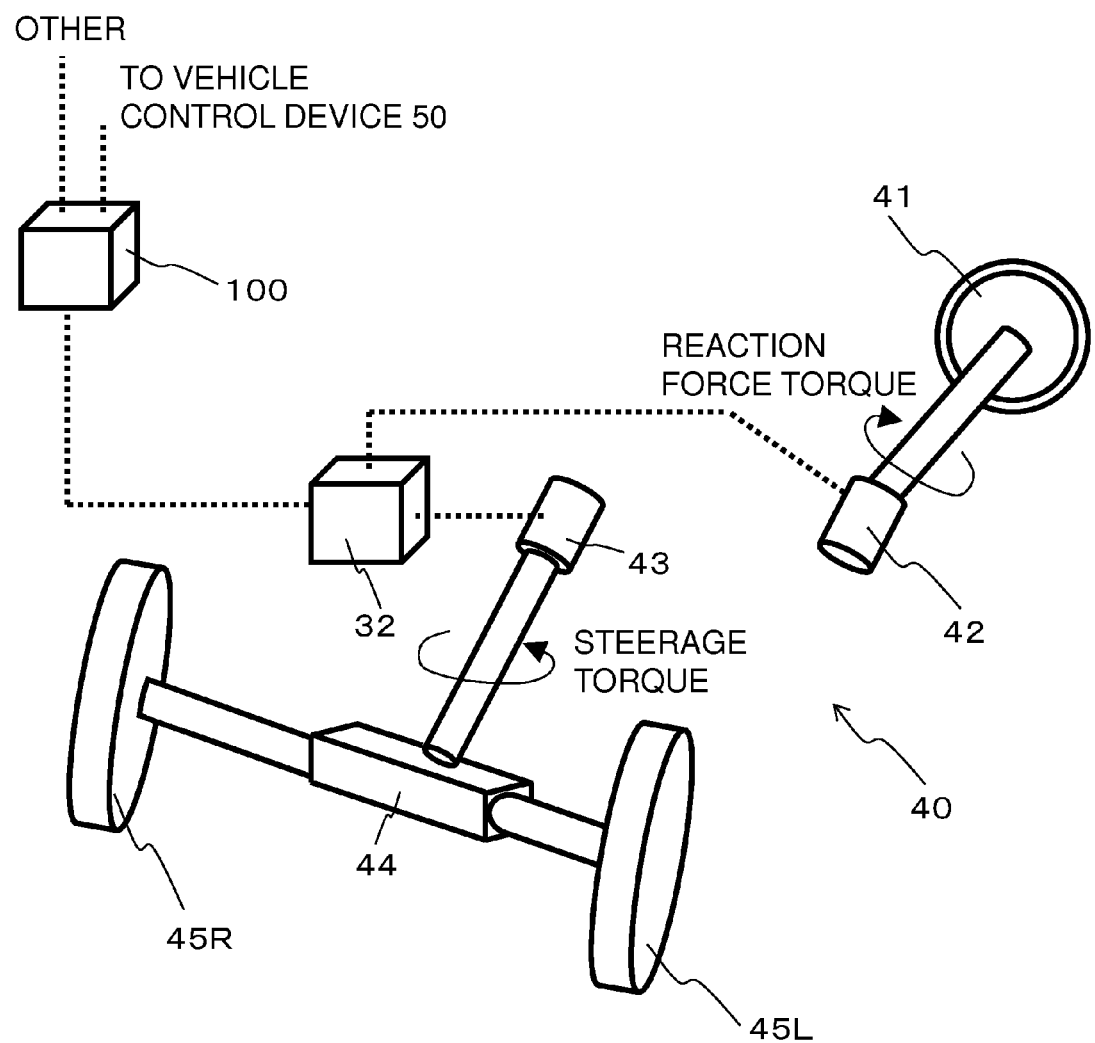
FIG. 5 is a schematic diagram showing a steering system which is made up of a steering control device and a steering device.

Next, the steering system will be explained below by referring to FIG. 5.

The steering system is made up of the aforementioned steering control device 32 and a steering device 40. The steering device 40 includes a steering wheel 41, a reaction force motor 42 having a steering angle sensor, a steerage motor 43 having a steerage angle sensor, and a rack-and-pinion gear 44.

When the driver operates the steering wheel 41, the steering angle sensor of the reaction force motor 42 measures the operation amount of the steering wheel 41 and sends the detected operation amount to the steering control device 32. The steering control device 32 sends a torque signal to the steerage motor 43 having the steerage angle sensor which measures steerage angles of tires 5R, 5L so that the present steerage angle equals a steerage angle corresponding to the steering angle of the driver. Front wheels 45R and 45L are turned (steerage) by steerage torque which is generated by the steerage motor 43 and transmitted via the rack-and-pinion gear 44. Depending on the magnitude of this torque, reaction force torque is transmitted to the reaction force motor 42 having the steering angle sensor, by which reaction force is transmitted to the steering wheel 41. At the same time, the steering control device 32 sends the steering angle to the controller 100. The steering control device 32 has a function of receiving a steerage torque correction value from the controller 100 and operating the steerage motor 43 (having the steerage angle sensor) according to the received steerage torque correction value. Whether the steering control device 32 similarly sends the reaction force torque to the reaction force motor 42 having the steering angle sensor or not can be changed properly based on the mode (explained later) at that time and a command from the controller 100. For example, if the steering control device 32 receiving the steerage torque correction value from the controller 100 operates the steerage motor 43 having the steerage angle sensor according to the correction value without sending the reaction force command value to the reaction force motor 42 having the steering angle sensor, the driver loses the steering feeling at that moment even though the vehicle (dump truck) turns according to the steering angle. In contrast, if no command is sent to the steerage motor 43 having the steerage angle sensor even with the steering operation by the driver, the vehicle (dump truck) does not turn in spite of the turning of the steering wheel 41. This means is effective when the controller 100 judges that the steering wheel 41 should not be operated for some reason, for example. As means for informing the driver that the steering wheel 41 should not be operated at the moment, the steering control device 32 may generate torque in a direction opposite to the direction of the driver's operation on the steering wheel 41. The torque makes the driver feel that the steering wheel 41 is heavy and recognize that the steering wheel 41 should not be operated in the direction.

While the steer-by-wire system in which the steering wheel 41 is not directly linked to the front wheels 45R and 45L has been explained in this embodiment, the steering system is not limited thereto. For example, an electric power steering system in which the reaction force motor 42 having the steering angle sensor and the steerage motor 43 having the steerage angle sensor are directly connected together as an integral component may also be employed. Further, the steerage motor 43 having the steerage angle sensor may also be implemented by a motor of the hydraulic servo type. Furthermore, the correction value sent from the controller 100 may also be a corrected angle instead of the torque. In this case, the steering control device 32 may be configured to perform torque feedback control so as to eliminate the deviation between the angle detected by the steerage angle sensor and the corrected angle.

Figure 6:
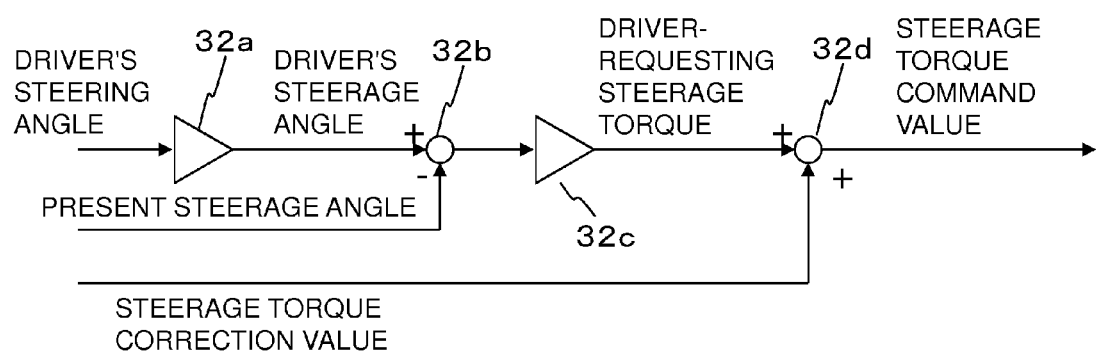
FIG. 6 is a block diagram showing a function of the steering control device for calculating a steerage torque command value.

FIG. 6 is a block diagram showing a function of the steering control device 32 for calculating a steerage torque command value. A conversion unit 32a of the steering control device 32 converts the driver's steering angle received from the reaction force motor 42 having the steering angle sensor into a driver steerage angle by multiplying the driver's steering angle by a gain factor. A calculation unit 32b subtracts the present steerage angle from the driver steerage angle. A conversion unit 32c converts the subtraction result into driver-requesting steerage torque by multiplying the subtraction result by a gain factor. Then, a calculation unit 32d calculates the steerage torque command value by adding the steerage torque correction value (received from the controller 100) to the driver-requesting steerage torque. The calculated steerage torque command value is outputted to the steerage motor 43 having the steerage angle sensor.

<Vehicle Speed Control>

Figure 7:
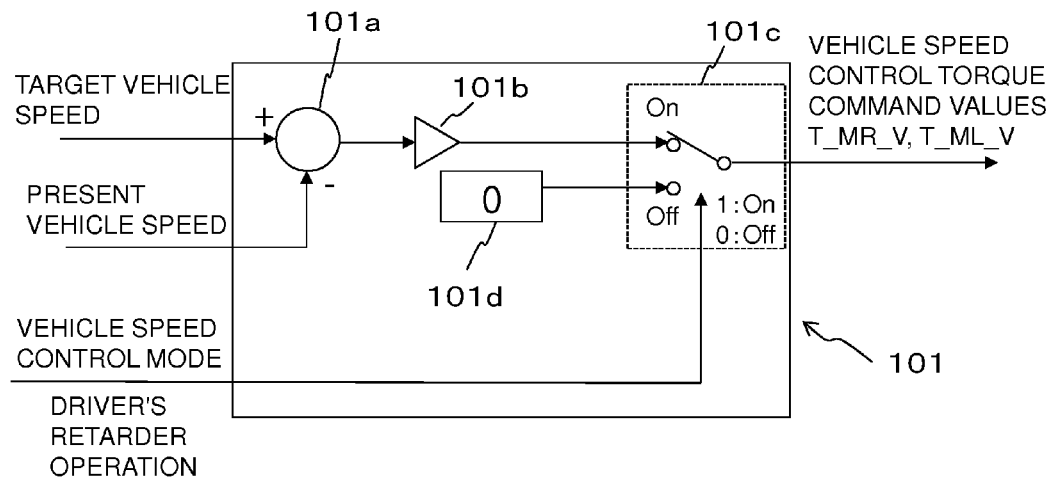
FIG. 7 is a block diagram for explaining a function of a vehicle speed control unit of a controller.

Referring again to FIG. 3, the controller 100 includes a vehicle speed control unit 101. When a vehicle speed control mode has been selected, the vehicle speed control unit 101 implements the control of the vehicle speed according to the vehicle speed control mode, by executing feedback control to the present vehicle speed with respect to a target vehicle speed that is set in the vehicle speed control mode. FIG. 7 is a block diagram for explaining the function of the vehicle speed control unit 101. As shown in FIG. 7, when the vehicle speed control mode is ON (1), that is, when a switch unit 101c is at its ON position, the vehicle speed control unit 101 receiving the target vehicle speed and the present vehicle speed calculates the difference between the two vehicle speeds with a calculation unit 101a, calculates the torque command values T_MR_V and T_ML_V (for changing the present vehicle speed to the target vehicle speed) with a conversion unit 101b by multiplying the difference by a gain factor, and outputs the calculated torque command values T_MR_V and T_ML_V. The vehicle speed control unit 101 receives revolution speeds ωR and ωL of the electric motors 6R and 6L detected by the electromagnetic pickups 16R and 16L and calculates the vehicle speed from the revolution speeds. The calculation of the vehicle speed may also be performed by using the measurements by the electromagnetic pickups 36R and 36L or the measurement by the ground speed sensor 37 as mentioned above. Thus, a vehicle speed detecting device may be formed by the vehicle speed control unit 101, the electromagnetic pickup sensors 16R and 16L for the rear wheels, the electromagnetic pickup sensors 36R and 36L for the front wheels, and the ground speed sensor 37. A command specifying whether or not to shift to the vehicle speed control mode may be issued according to the driver's operation on a switch of the vehicle control device 50 or according to an input from the outside, for example. The cancellation of the vehicle speed control mode may be made according to the driver's depressing the retarder pedal 12 or according to an input from the outside. When the vehicle speed control mode is canceled, the command of the vehicle speed control mode is turned OFF (0) (i.e., the switch unit 101c is turned OFF) and a vehicle control torque command value 0 is outputted by a zero output unit 101d. The controller 100, having a preset table of engine revolution speed command values corresponding to various torque command values T_MR_V and T_ML_V, outputs an engine revolution speed command value to the engine 21 based on the table.

<Yaw Moment Control>

Figure 8:
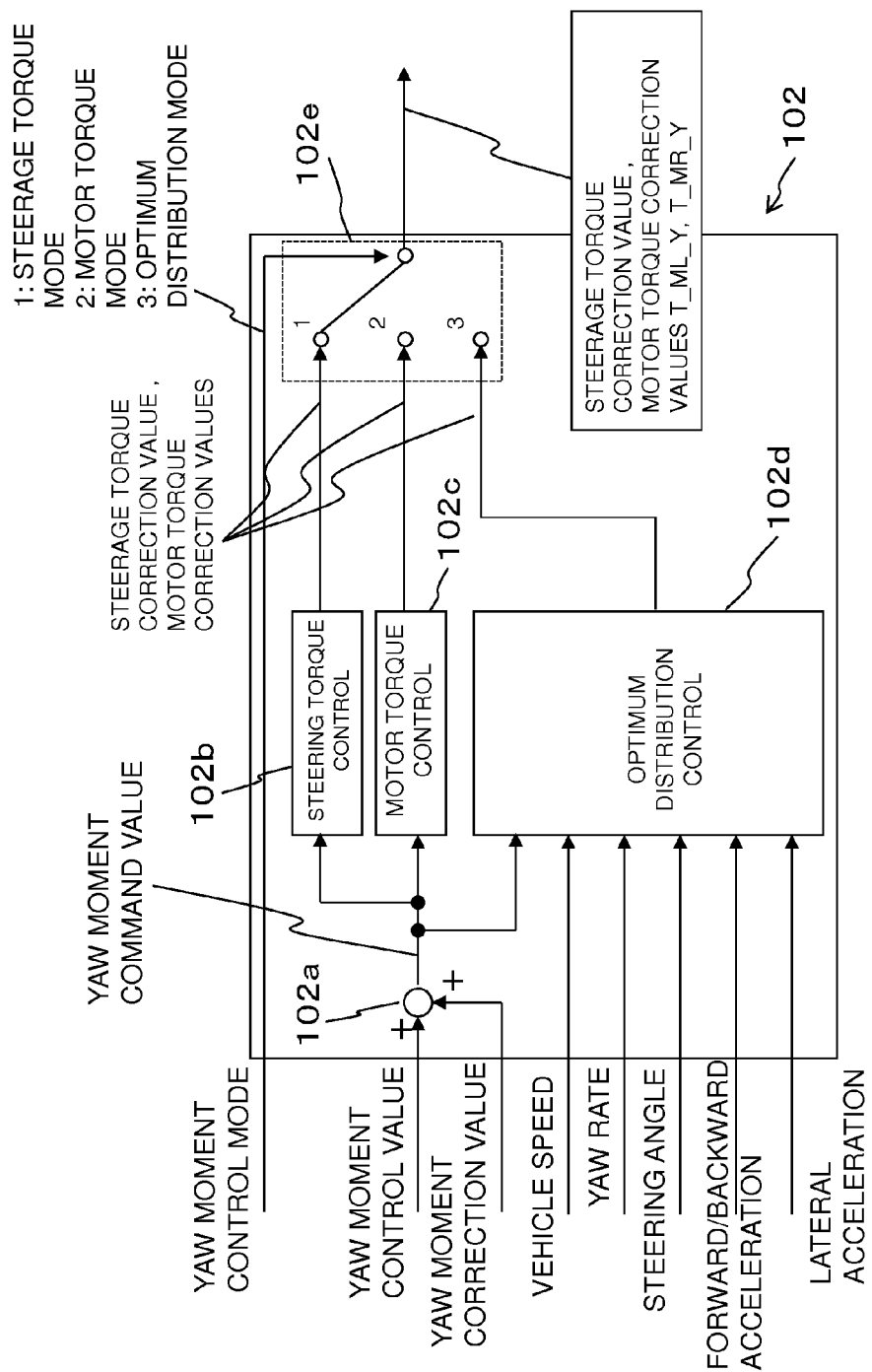
FIG. 8 is a block diagram showing the details of a function of a yaw moment control unit of the controller.

As shown in FIG. 3, the controller 100 further includes a yaw moment control unit 102 for controlling the turning direction of the vehicle. FIG. 8 is a block diagram showing the details of the function of the yaw moment control unit 102. As shown in FIG. 8, input signals to the yaw moment control unit 102 include, for example, a yaw moment control value which is generated by other yaw moment control (e.g., sideslip prevention control), a yaw moment correction value which is generated according to the present invention, the vehicle speed, the forward/backward acceleration, the lateral acceleration, the yaw rate, the steering angle, and a command of a yaw moment control mode. Output signals from the yaw moment control unit 102 are the steerage torque correction value and the torque correction values T_MR_Y and T_ML_Y for the motors. The yaw moment control value and the yaw moment correction value are added together by a calculation unit 102a to determine a yaw moment command value. The yaw moment command value is inputted to a steering torque control unit 102b, a motor torque control unit 102c and an optimum distribution control unit 102d. The steering torque control unit 102b calculates a steerage torque correction value based on the inputted yaw moment command value. The motor torque control unit 102c calculates motor torque correction values based on the inputted yaw moment command value. The optimum distribution control unit 102d calculates a yaw moment distribution ratio based on the yaw moment command value, the vehicle speed, the yaw rate, the steering angle, the forward/backward acceleration and the lateral acceleration inputted thereto and then calculates a steerage torque correction value and motor torque correction values corresponding to the yaw moment distribution ratio. The command of the yaw moment control mode is inputted to a switch unit 102e. When the yaw moment control mode is mode 1, the switch unit 102e outputs the steerage torque correction value calculated by the steering torque control unit 102b. When the yaw moment control mode is mode 2, the switch unit 102e outputs the motor torque correction value calculated by the motor torque control unit 102c. When the yaw moment control mode is mode 3, the switch unit 102e outputs the steerage torque correction value and the torque correction values for the right and left motors calculated by the optimum distribution control unit 102d.

<Setting of Yaw Moment Control Mode>

In mines where the dump trucks are traveling, there is an increasing request for the reduction of the time necessary for transporting earth, sand, etc. This is because the reduction of the necessary time shortens the earth/sand transportation cycle of each dump truck and increases the number of times of transportation. The vehicle speed is the major factor directly contributing to the reduction of the necessary time. Therefore, it is desirable to avoid control that causes a decrease in the vehicle speed.

Figure 9:
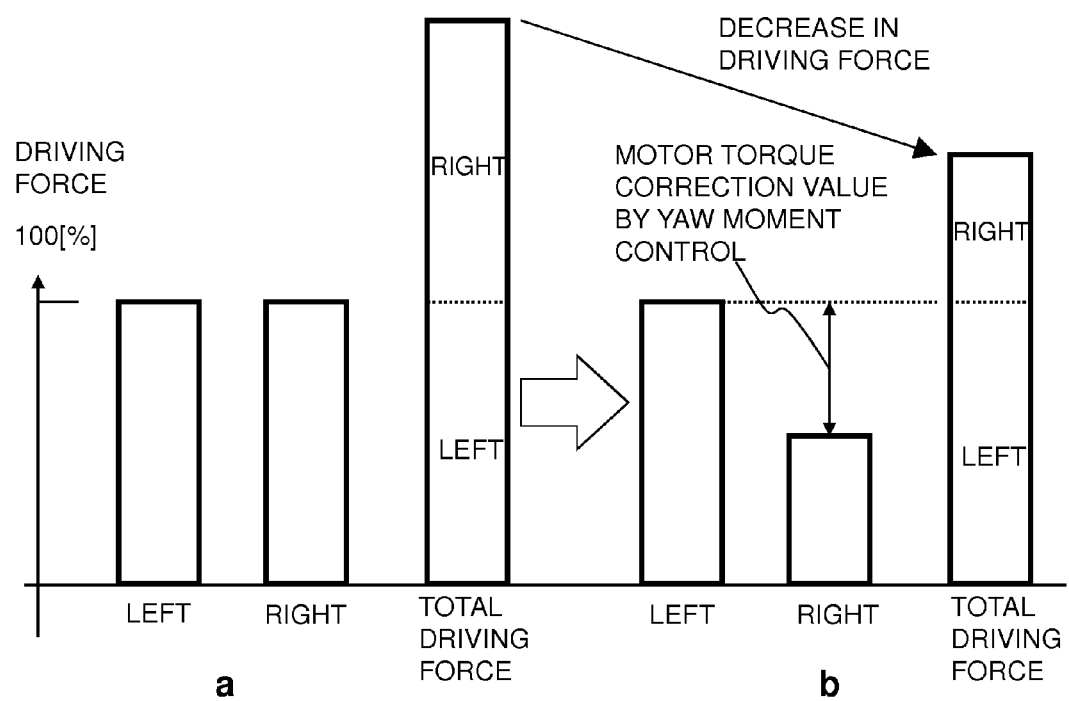
FIG. 9 is a graph showing the effect of a method implementing a yaw moment correction value by a driving force difference on the total driving force of the motors when the vehicle is traveling with its 100% motor driving force.

FIG. 9 is a graph showing the effect of a method implementing the yaw moment correction value by a driving force difference on the total driving force of the motors when the vehicle is traveling with its 100% motor driving force. For example, assuming that the vehicle is currently traveling at a constant speed with its 100% driving force as shown on the left side "a" of FIG. 9, the total driving force of the vehicle is in balance with the traveling resistance (air resistance, frictional resistance, slope angle, etc.). In the configuration of this embodiment, the "100% driving force" means the output limits of the rear wheel motors, that is, the maximum value of the driving force that the motors can output at that speed. Let us consider here the method of generating the yaw moment by giving driving/braking force to the vehicle. In this case, the generation of the yaw moment can only be achieved by decreasing the driving force of one of the right and left motors as shown on the right side "b" of FIG. 9 since the motors are already at their output limits as mentioned above. While a yaw moment corresponding to the decrease in the driving force is generated in the vehicle, the vehicle speed drops due to the decrease in the driving force. This goes against the aforementioned request for the time reduction. Therefore, the actuator that should generate the yaw moment in this case is desired to operate in a way not causing a considerable speed drop. Thus, setting the yaw moment control mode to the mode 1 as shown in FIG. 8 is appropriate in this case. In contrast, when the driving force of the vehicle is below 100%, the yaw moment control mode is switched to the motor torque control (yaw moment control mode 2) or the optimum distribution control (yaw moment control mode 3) depending on the magnitude of the driving force and other vehicle state quantities.

<Combining of Motor Torque Generated by Each Unit>

Figure 10:
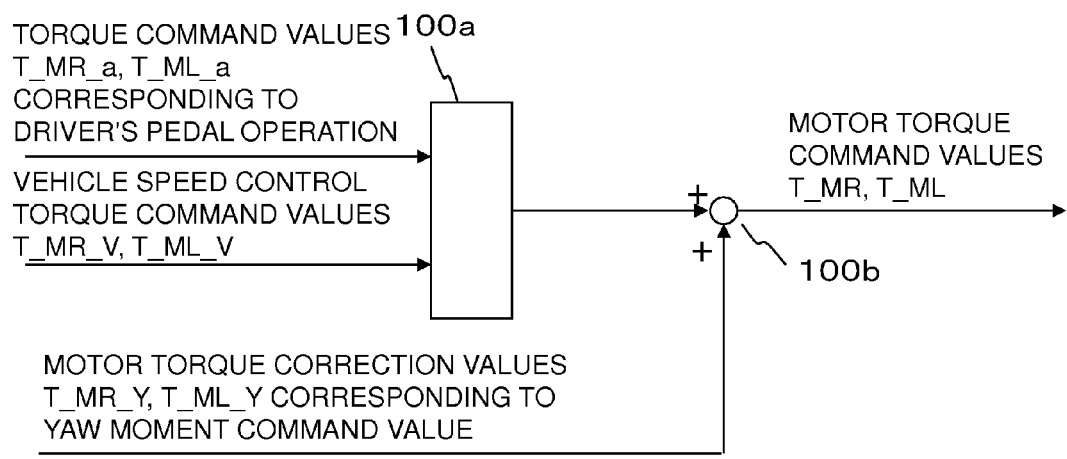
FIG. 10 is a schematic diagram showing an example of a method for calculating motor torque command values.

A method for the calculation of the motor torque command values by the controller 100 will be explained referring to FIG. 10. FIG. 10 is a schematic diagram showing an example of the method for calculating the motor torque command values. First, a processing unit 100a selects the aforementioned torque command values T_MR_a and T_ML_a corresponding to the driver's operation on the accelerator/retarder pedals or the torque command values T_MR_V and T_ML_V generated by the vehicle speed control. For example, the processing unit 100a selects the driver's torque command when it exists. Otherwise, the processing unit 100a selects the torque command for the vehicle speed control. Thereafter, a calculation unit 100b calculates motor torque command values T_MR and T_ML by adding the motor torque correction values T_MR_Y and T_ML_Y corresponding to the yaw moment command value generated by the yaw moment control unit 102 respectively to the torque command values selected by the processing unit 100a. This motor torque combining method is just an example; various other methods (e.g. publicly-known methods) may be used.

<Overall Configuration of Characteristic Part>

Next, the overall configuration of the characteristic part of the electrically driven dump truck in accordance with this embodiment will be explained below referring to FIG. 11.

As mentioned above, the drive system of the electrically driven dump truck of this embodiment includes the trolley wire detecting device 15 for detecting the trolley wires 3R and 3L and the vehicle control device 50.

The trolley wire detecting device 15 can be implemented typically by a sensor such as a laser radar, a millimeter wave radar or a camera. In an X-Y plane formed by an X-axis representing the traveling direction of the vehicle (direction of the vehicle axis) and a Y-axis representing the lateral direction (perpendicular to the vehicle axis) of the vehicle, any one of the above sensors serves in the present invention as means for detecting the relative positional relationship between the vehicle and the trolley wires. In the case of the laser radar, scanning (searching for the trolley wires) in the X-axis direction of the vehicle is effective for precisely detecting the trolley wires. In the case of the millimeter wave radar, ill effect of the weather (fog, rain, etc.) is lighter in comparison with other types of sensors. These radar sensors are capable of detection not only in the XY directions but also in the Z direction (height direction of the vehicle and the trolley wires). Therefore, the radar sensors can be suitable in cases where the system of the present invention is used together with a system needing the detection in the height direction.

In the case of the camera, images of the trolley wires are shot from below, and thus the trolley wires can be detected precisely in the daytime with fine weather thanks to high contrast between the sky and the trolley wires. It is also possible to equip the vehicle 1 with an illuminating device 51 for illuminating the trolley wires 3R and 3L. In this case, the illumination of the trolley wires 3R and 3L with the illuminating device 51 keeps high contrast between the sky and the trolley wires, by which the trolley wires can be detected precisely even when such high contrast is hardly achieved (evening, nighttime, rainy weather, etc.).

The system may also be constructed by combining two or more sensors.

Figure 11:
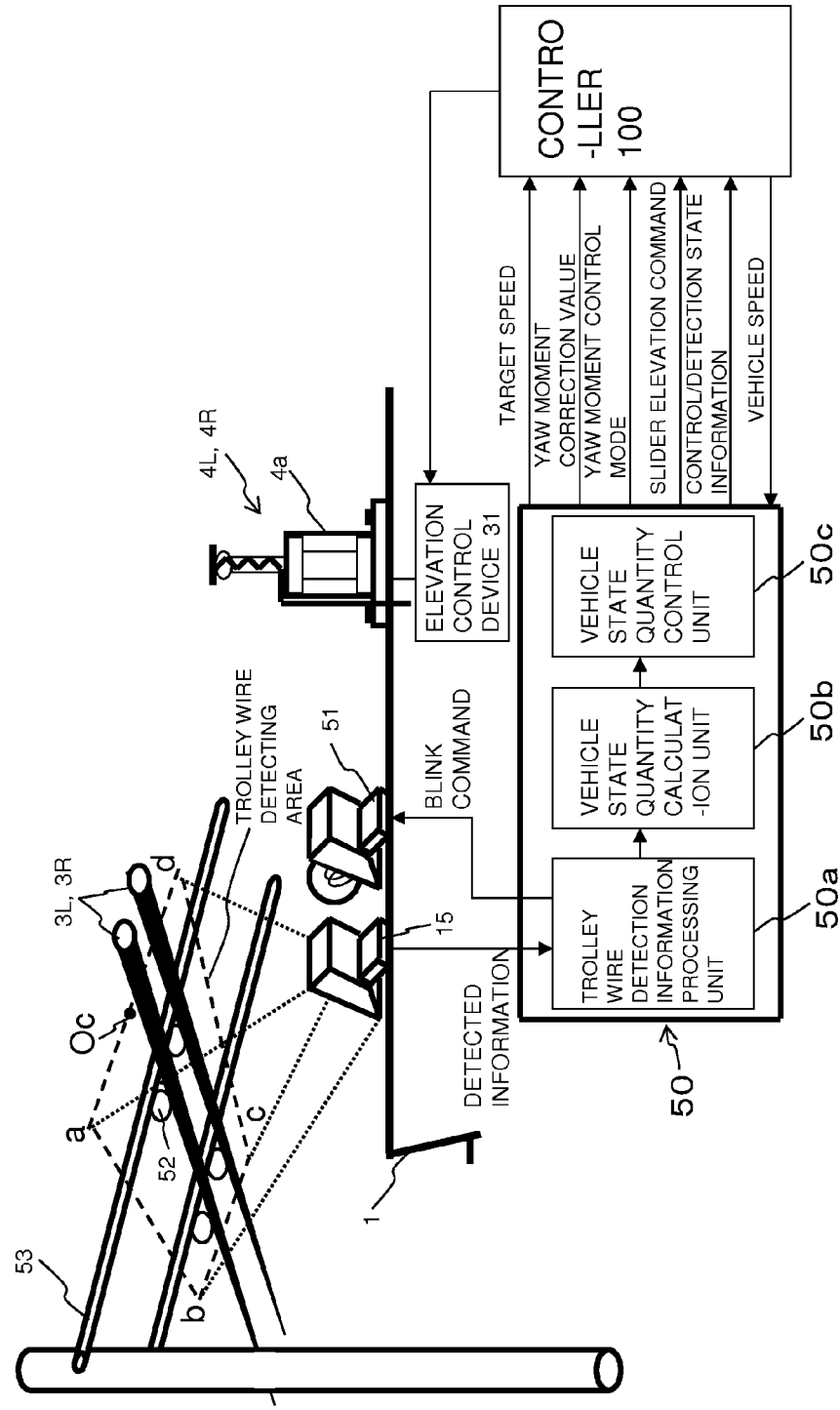
FIG. 11 is a schematic diagram showing the configuration of a vehicle control device and the input-output relationship between the vehicle control device and the controller.

FIG. 11 is a schematic diagram showing the configuration of the vehicle control device 50 and the input-output relationship between the vehicle control device 50 and the controller 100. As shown in FIG. 11, the vehicle control device 50 includes a trolley wire detection information processing unit 50a, a vehicle state quantity calculation unit 50b, and a vehicle state quantity control unit 50c. The trolley wire detection information processing unit 50a acquires information on the relative positional relationship between the vehicle and the trolley wires by processing information detected by the trolley wire detecting device 15. The vehicle state quantity calculation unit 50b calculates state quantities of the vehicle based on the information acquired by the trolley wire detection information processing unit 50a. The vehicle state quantity control unit 50c controls the vehicle state quantities based on the result of the calculation by the vehicle state quantity calculation unit 50b. The trolley wires 3R and 3L are supported by supports 53 via insulators 52. The vehicle control device 50 outputs a target speed correction value, the yaw moment correction value, the yaw moment control mode, the elevation control device elevation command, control/detection state information, etc.

In this embodiment, the explanation of the detection of the trolley wires will be given of a case where a camera is used as the trolley wire detecting device 15 and the relative positional relationship between the vehicle and the trolley wires in the X-Y plane is detected by performing image processing. Thus, the trolley wire detecting device 15 is implemented by a camera and the trolley wire detection information processing unit 50a is implemented by an image information processing unit which processes the image information captured by the camera 15.

<Camera 15 and Image Information Processing Unit 50a>

The camera 15 captures images of the trolley wires 3R and 3L. In this case where the two trolley wires 3R and 3L are shot by one camera, the camera 15 is desired to be placed at the center of the right and left trolley wires 3R and 3L. It is also possible to shoot each of the right and left trolley wires 3R and 3L respectively with one camera. The image information captured by the camera 15 is sent to the image information processing unit 50a of the vehicle control device 50. The image information represents pixel arrangement in the area shot by the camera 15. The image information processing unit 50a converts the image information into necessary information.

When a strong light source exists in the shooting direction of the camera 15, a whitening and blurring effect called "halation" can occur to the image inputted to the image information processing unit 50a and this can disable the recognition of the target of detection. As a countermeasure against this problem, it is possible to use two cameras: one for shooting the trolley wires 3R and 3L in front of the vehicle and another for shooting the trolley wires 3R and 3L in back of the vehicle. When the image information processing unit 50a judges that the halation has occurred in an image captured by one camera, a correction can be made by use of the other camera. The halation can be detected according to publicly known methods. The two-camera configuration is effective not only when the halation occurs but also when the visual field of one camera is blocked. When the image information processing unit 50a judges that the visual field of one camera is blocked by dirt, mud, etc., a correction can be made similarly by using the other camera. It is also possible to enclose the camera 15 with a housing, make the camera 15 shoot the trolley wires 3R and 3L through glass of the housing, and wash the glass with a wiper, washer fluid, etc. when the image information processing unit 50a judges that the visibility through the glass has been deteriorated by dirt, mud, etc.

When the image information processing unit 50a judges that the amount of ambient light is insufficient for the detection of the trolley wires 3R and 3L (twilight, darkness, etc.), the image information processing unit 50a may output a blink command to the illuminating device 51 to make the illuminating device 51 illuminate the trolley wires 3R and 3L and maintain high contrast between the sky and the trolley wires.

Figure 12:
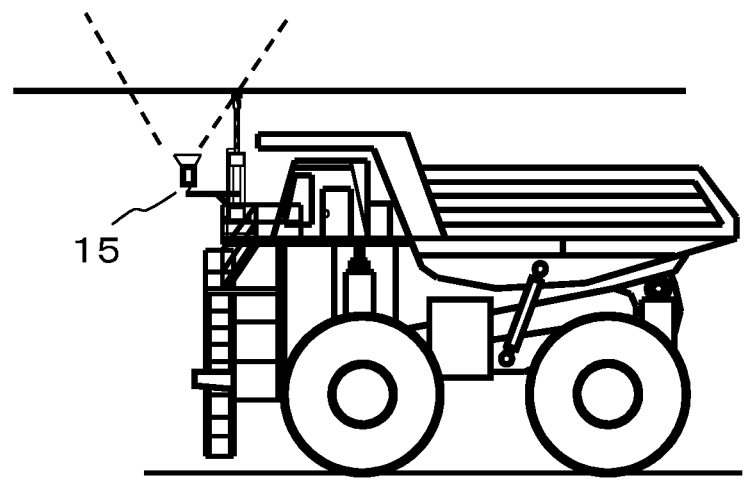
FIG. 12 is a schematic diagram showing the positional relationship between the vehicle and an imaging area (detection area by trolley wire detecting device) of a camera viewed from the side of the vehicle.
Figure 13:
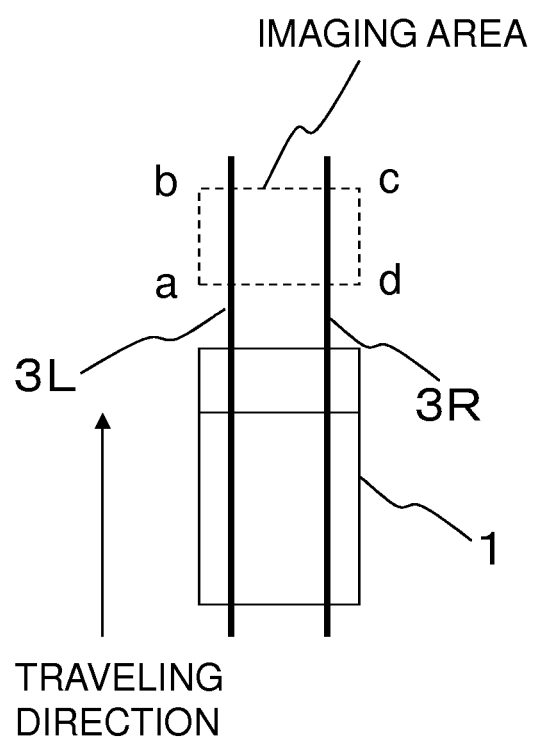
FIG. 13 is a schematic diagram showing the positional relationship between the vehicle and the imaging area (detection area by trolley wire detecting device) of the camera viewed from above (above the vehicle).
Figure 14:
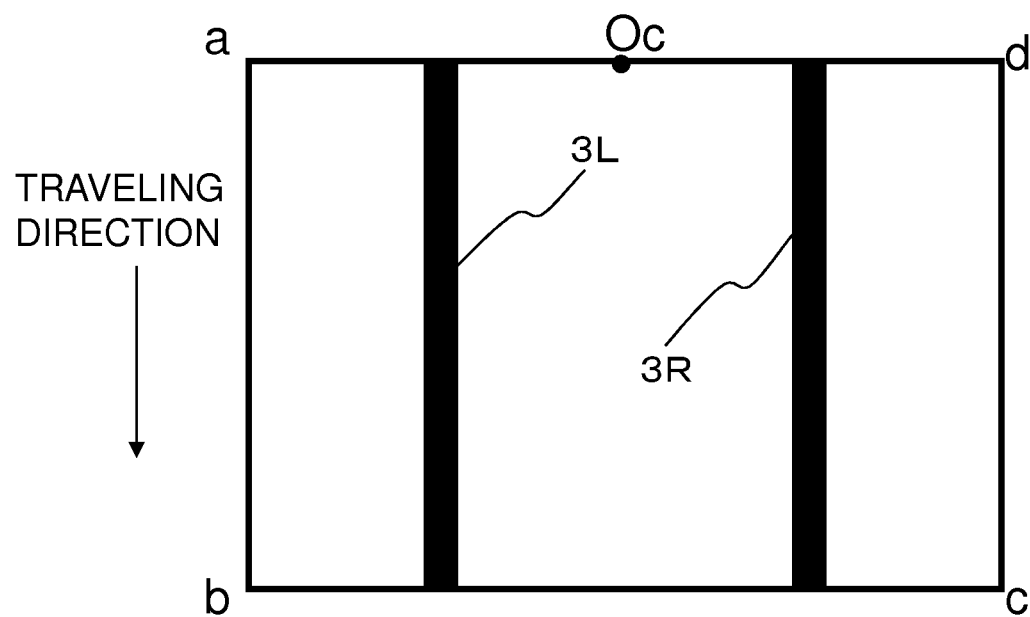
FIG. 14 is a schematic diagram showing an image captured by the camera.

In this embodiment, a case where the camera 15 captures images in the direction directly above the vehicle as shown in FIG. 12 (not in the oblique direction as shown in FIG. 11) will be considered for the simplicity of the explanation. In this case, an imaging area a, b, c, d of the camera 15 (detecting area of the trolley wire detecting device) is set in front of the vehicle as shown in FIG. 13. FIG. 14 is a schematic diagram showing an image captured by the camera 15 in this case. Since the camera 15 has shot the image of the trolley wires 3R and 3L from below in FIG. 14, the anteroposterior relationship among the points a, b, c and d (positional relationship between the line a-d and the line b-c) and the traveling direction of the vehicle are opposite to those in FIG. 13 in which the trolley wires 3R and 3L are viewed from above.

Figure 15:
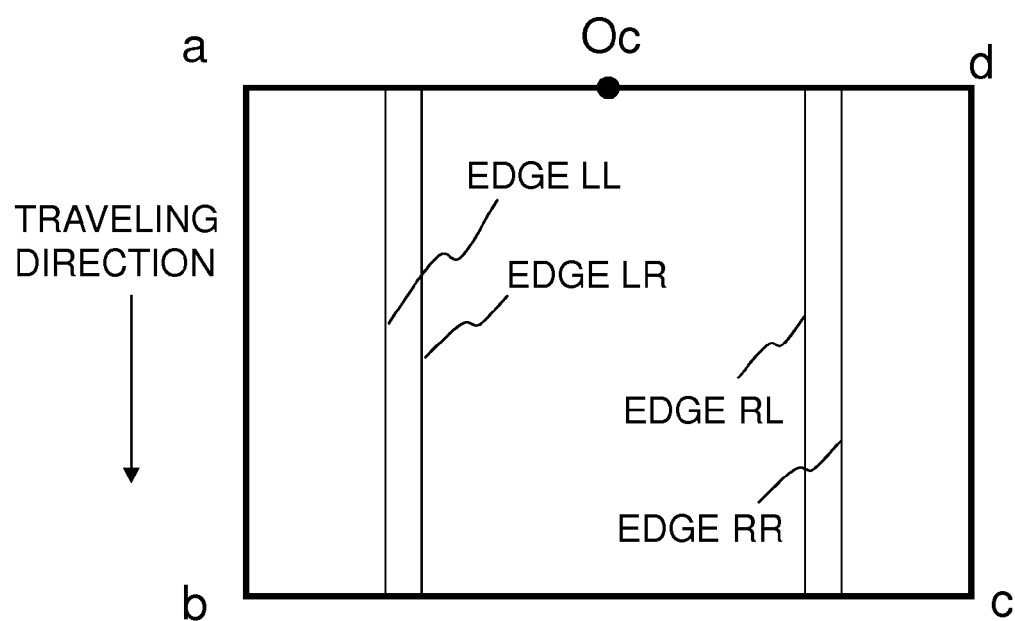
FIG. 15 is a schematic diagram showing a process (edge extraction) performed on the captured image.
Figure 16:
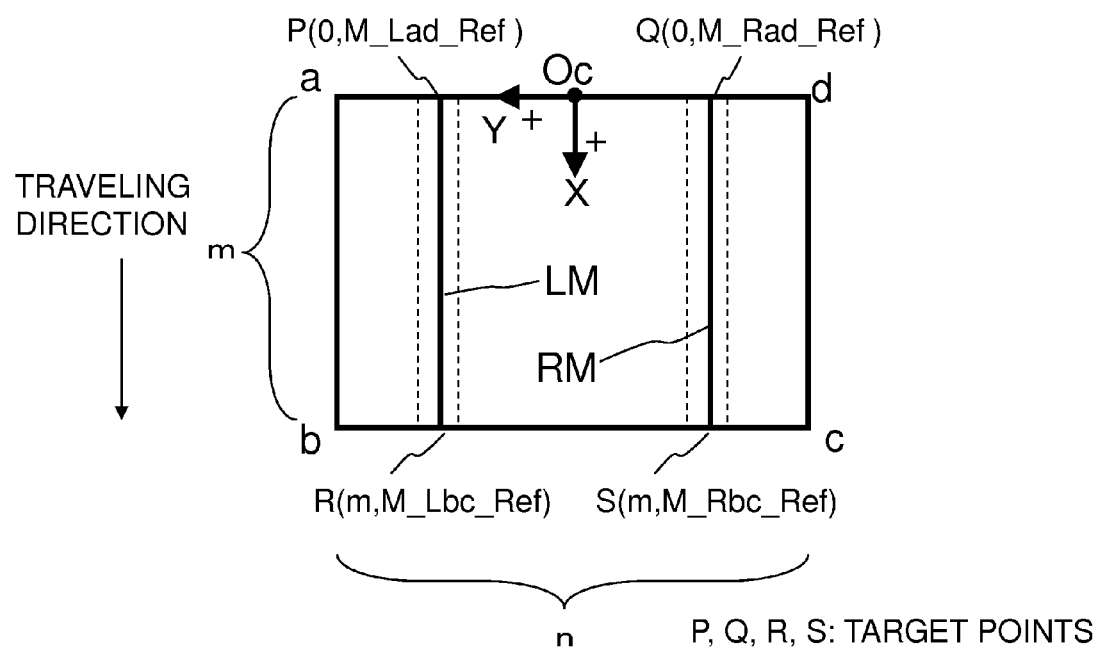
FIG. 16 is a schematic diagram showing a process (center line extraction) performed on the captured image.

As shown in FIG. 14, in the image information acquired by the camera 15, the trolley wires 3R and 3L appear in parallel with the traveling direction (in the vertical direction in the image). On this image information, a process for extracting edge parts (edging process) is performed as shown in FIG. 15. By the edging process, the right trolley wire 3R is split into edges RR and RL, while the left trolley wire 3L is split into edges LR and LL. Subsequently, as shown in FIG. 16, a center line of the edges is determined for each of the right and left trolley wires 3R and 3L (a center line RM for the right trolley wire 3R and a center line LM for the left trolley wire 3L). Then, a coordinate system in regard to the pixel number is set with its origin situated at the top center Oc of the image (with its X-axis extending in the direction parallel to the line ab and its Y-axis extending in the direction parallel to the line da). Subsequently, the intersection point P (0, M_Lad_Ref) of the center line LM and the line ad, the intersection point Q (0, M_Rad_Ref) of the center line RM and the line ad, the intersection point R (m, M_Lbc_Ref) of the center line LM and the line bc, and the intersection point S (m, M_Rbc_Ref) of the center line RM and the line bc are set with respect to the origin Oc. These points P, Q, R and S, existing on the trolley wires 3R and 3L, are defined as target points. Incidentally, the number "m" represents the number of pixels in the vertical direction and the number "n" represents the number of pixels in the horizontal direction.

If each trolley wire 3R, 3L is situated at the center of each slider 4Ra, 4La when the vehicle is traveling straight at the center of the two trolley wires 3R and 3L and in parallel with the trolley wires 3R and 3L, this serves as robustness against deviations (displacement) caused by lateral (right/left) misalignment and vibration (jolting) of the vehicle. Therefore, the vehicle is desired to keep on traveling in such a state.

Figure 17:
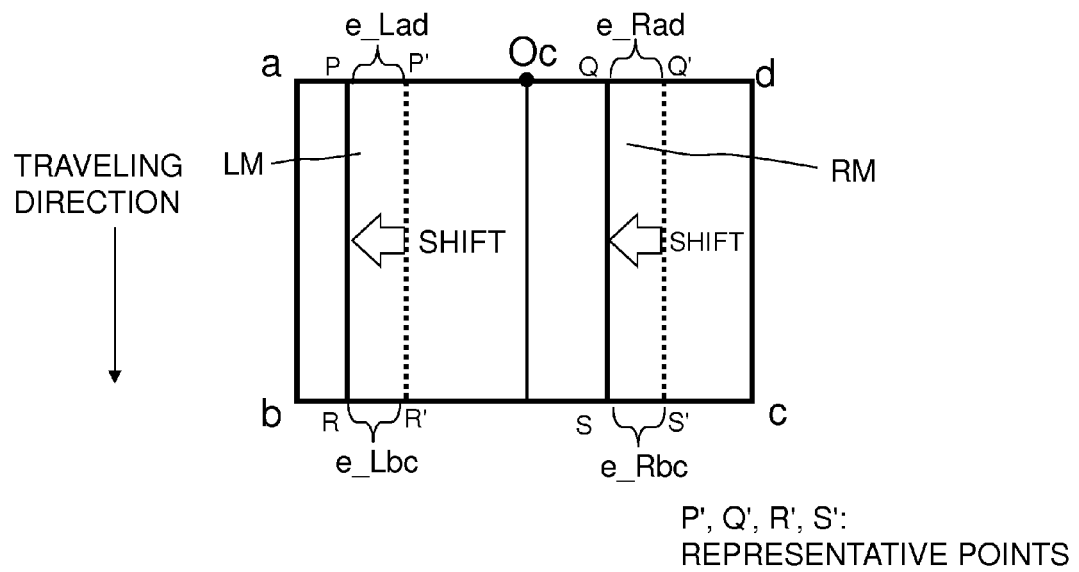
FIG. 17 is a schematic diagram showing a camera image captured when the vehicle has shifted to the left with respect to the trolley wires.

FIG. 17 shows a state in which the vehicle has shifted to the left with respect to the trolley wire. By setting representative points of the vehicle 1 at intersection points of lines parallel to the X-axis (i.e., in the traveling direction of the vehicle 1) and passing through the center of the slider 4Ra or 4La and the lines ad and bc of the imaging area, the points P', Q', R' and S' shown in FIG. 17 are acquired as the representative points. These representative points are points used for controlling the position of the vehicle with respect to the trolley wires 3R and 3L. Therefore, the representative points P', Q', R' and S' can also be referred to as control points. Coordinates of these representative points are defined as M_Lad_Cont, M_Rad_Cont, M_Lbc_Cont and M_Rbc_Cont, respectively.

Figure 18:
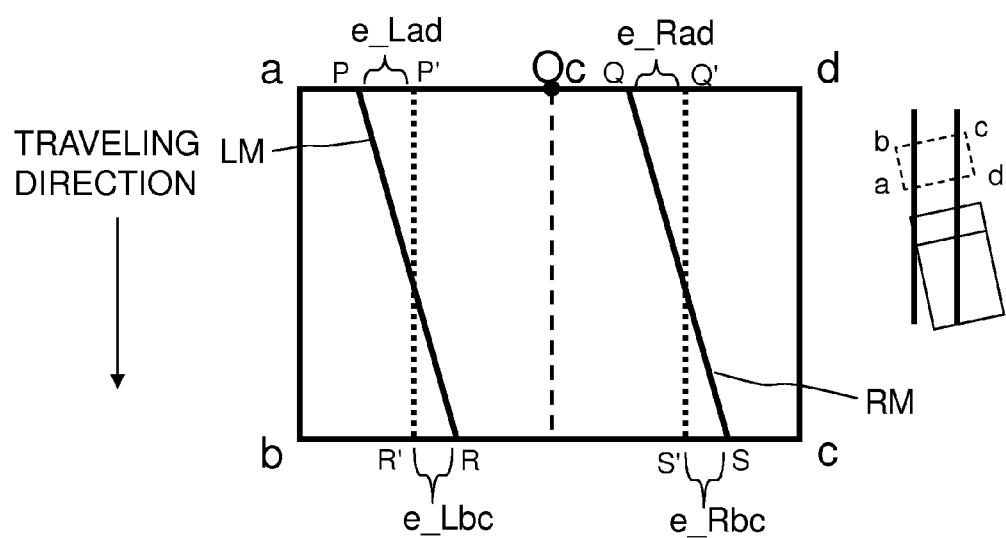
FIG. 18 is a schematic diagram showing a camera image captured when the vehicle is traveling obliquely to the trolley wires.

FIG. 18 shows a case where the vehicle is traveling obliquely to the trolley wires 3R and 3L. Also in this case, the representative points of the vehicle are defined as the points P', Q', R' and S'.

The image information processing unit 50a sends the coordinate information on these points to the vehicle state quantity calculation unit 50b.

<Vehicle State Quantity Calculation Unit 50b and Vehicle State Quantity Control Unit 50c>

The vehicle state quantity calculation unit 50b is a component for calculating state quantities to be used for generating control values and command values. The control values and command values generated by using the state quantities calculated by the vehicle state quantity calculation unit 50b include the yaw moment correction value used for executing control for giving an appropriate yaw moment to the vehicle 1 so that the vehicle 1 travels while tracing the trolley wires 3R and 3L (hereinafter referred to as "trolley wire tracing control" as needed), another yaw moment correction value used for executing control for giving an appropriate yaw moment to the vehicle 1 so that the vehicle 1 travels while meandering around the center of the trolley wires 3R and 3L (hereinafter referred to as "vehicle meandering control" as needed), the elevation control device elevation command issued for the elevation control of the slider 4Ra or 4La of the power collectors 4R and 4L (hereinafter referred to as "slider elevation control" as needed), the yaw moment control mode, the target speed correction value, etc. The vehicle state quantity control unit 50c is a component for generating and outputting the control values and the command values (the yaw moment correction values, the elevation control device elevation command, the yaw moment control mode, the target speed correction value, etc.) based on the result of the calculation by the vehicle state quantity calculation unit 50b.

<Trolley Wire Detecting Area and Coordinate System>

First, a trolley wire detecting area and a coordinate system used by the vehicle state quantity calculation unit 50b will be explained below.

Figure 19:
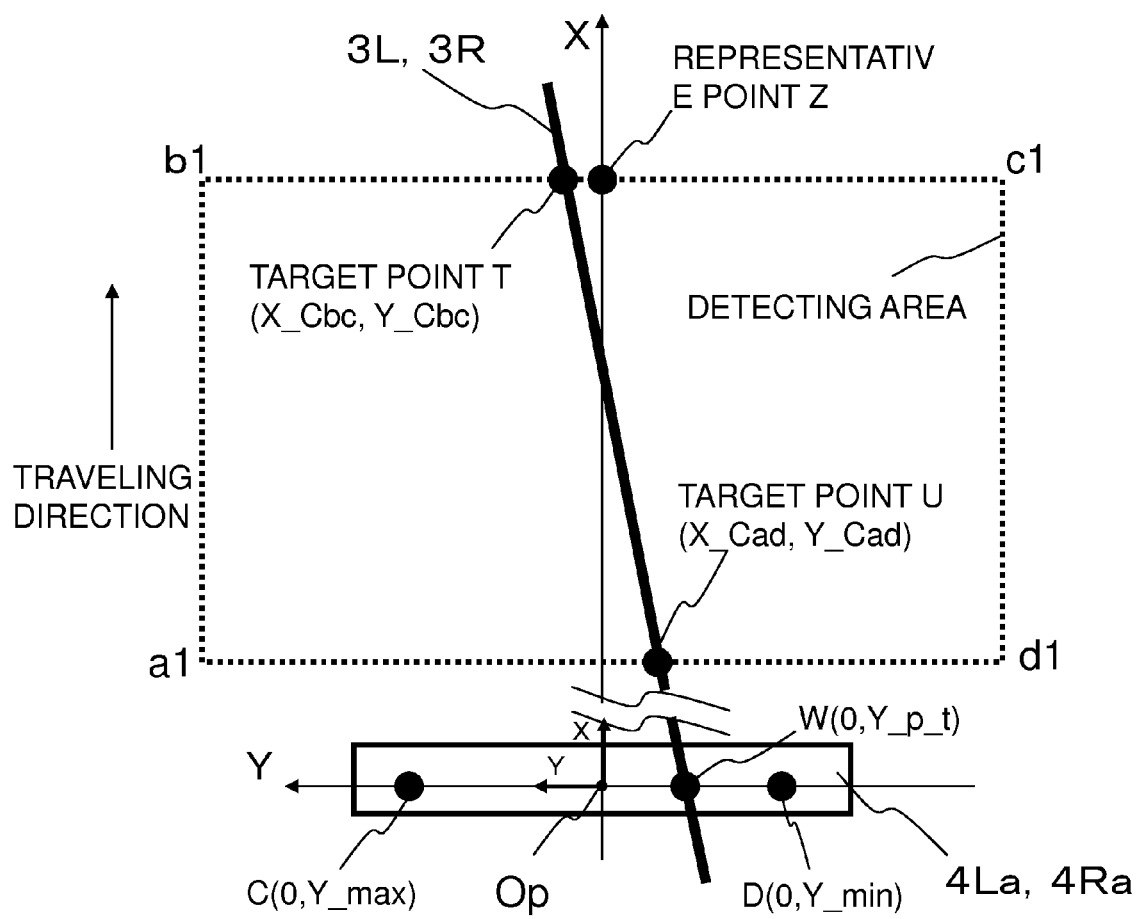
FIG. 19 is a schematic diagram showing a trolley wire detecting area and a coordinate system which are used in an embodiment of the present invention.

FIG. 19 is a schematic diagram showing the trolley wire detecting area and the coordinate system used in this embodiment.

From the image information on the imaging area a, b, c, d (see FIGS. 16-18) acquired by the image information processing unit 50a from the camera 15, the vehicle state quantity calculation unit 50b extracts and acquires an area like the area a1, b1, c1, d1 shown in FIG. 19 as the trolley wire detecting area. The side a1-d1 corresponds to a part of the side a-d of the imaging area a, b, c, d shown in FIGS. 16-18, while the side b1-c1 corresponds to a part of the side b-c of the imaging area a, b, c, d. The trolley wire detecting area a1, b1, c1, d1 indicates the positional relationship between the slider and the trolley wire 3R or 3L when the trolley wire 3R/3L is viewed from above. In the trolley wire detecting area a1, b1, c1, d1, a straight line passing through the center of the slider 4Ra/4La (regarding the lateral direction) and extending in the traveling direction of the vehicle passes through the center of the side a1-d1 and the center of the side b1-c1. As mentioned above, since the trolley wires 3R and 3L are shot from below in the image information on the imaging area a, b, c, d acquired by the camera 15, the anteroposterior relationship (vertical direction in FIG. 19) in the trolley wire detecting area a1, b1, c1, d1 (viewing the trolley wire 3R/3L from above) is opposite to that in the imaging area a, b, c, d.

Further, the vehicle state quantity calculation unit 50b sets a coordinate system having the origin (Op) at the center of the slider 4Ra/4La, the X-axis extending in the traveling direction, and the Y-axis extending leftward with respect to the traveling direction. In the coordinate system, the vehicle state quantity calculation unit 50b sets a representative point at the intersection point Z of the X-axis and the side b1-c1, and sets two target points at the intersection point T of the trolley wire 3R/3L and the side b1-c1 and at the intersection point U of the trolley wire 3R/3L and the side a1-d1. Since the camera 15 and the slider 4Ra/4La of the power collector 4R/4L are both attached to the vehicle and the positional relationship between the two components are already known, the coordinates of the intersection points Z, T and U can be determined with ease by means of coordinate transformation, by transforming coordinate values of the points P', P and R in the coordinate system with the origin Oc shown in FIGS. 16-18 into coordinate values in the coordinate system with the origin Op shown in FIG. 19.

<Trolley Wire Tracing Control>

The vehicle state quantity calculation unit 50b calculates the deviation between the representative point Z and the target point T. Since the Y-coordinate value Y_Cbc of the target point T in front of the slider 4Ra/4La equals the deviation between the representative point Z and the target point T, the vehicle state quantity calculation unit 50b uses the Y-coordinate value Y_Cbc of the target point T as the deviation between the representative point Z and the target point T. The deviation Y_Cbc takes on a positive/negative value when the vehicle has shifted rightward/leftward with respect to the trolley wires.

When the vehicle is traveling obliquely to the trolley wire 3R/3L, similar displacement is defined also in regard to the inclination of the vehicle. In this case, the inclination θ_t of the vehicle with respect to the trolley wire 3R/3L at a certain time t is represented by the following expression by using the coordinate values of the two target points T and U:

$$\theta\_t = (Y\_Cbc - Y\_Cad)/(X\_Cbc - X\_Cad) \quad (1)$$

The vehicle state quantity control unit 50c calculates the yaw moment correction value (for making the representative point Z coincide with the target point T) by using the deviation Y_Cbc between the representative point Z and the target point T or the inclination θ_t of the vehicle.

Figure 20:
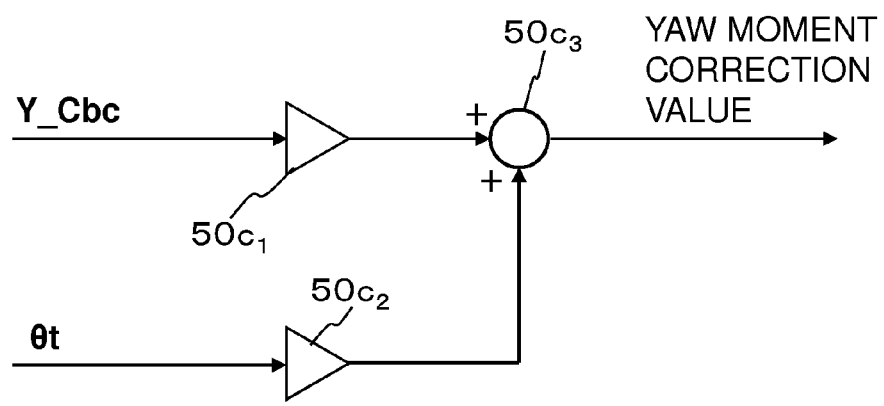
FIG. 20 is a block diagram showing the details of a function of a vehicle state quantity control unit (flow of calculation for converting deviation between a present position and a target position into the yaw moment correction value).

FIG. 20 is a block diagram showing a process for calculating the yaw moment correction value by using the deviation Y_Cbc or the inclination θ_t. In the vehicle state quantity control unit 50c, a conversion unit 50c₁ converts the deviation Y_Cbc into a yaw moment value by multiplying the deviation Y_Cbc by a gain factor. Similarly, a conversion unit 50c₂ converts the inclination θ_t into a yaw moment value by multiplying the inclination θ_t by a gain factor. A calculation unit 50c₃ calculates the yaw moment correction value by adding the two yaw moment values together and outputs the calculated yaw moment correction value to the yaw moment control unit 102.

Figure 21:
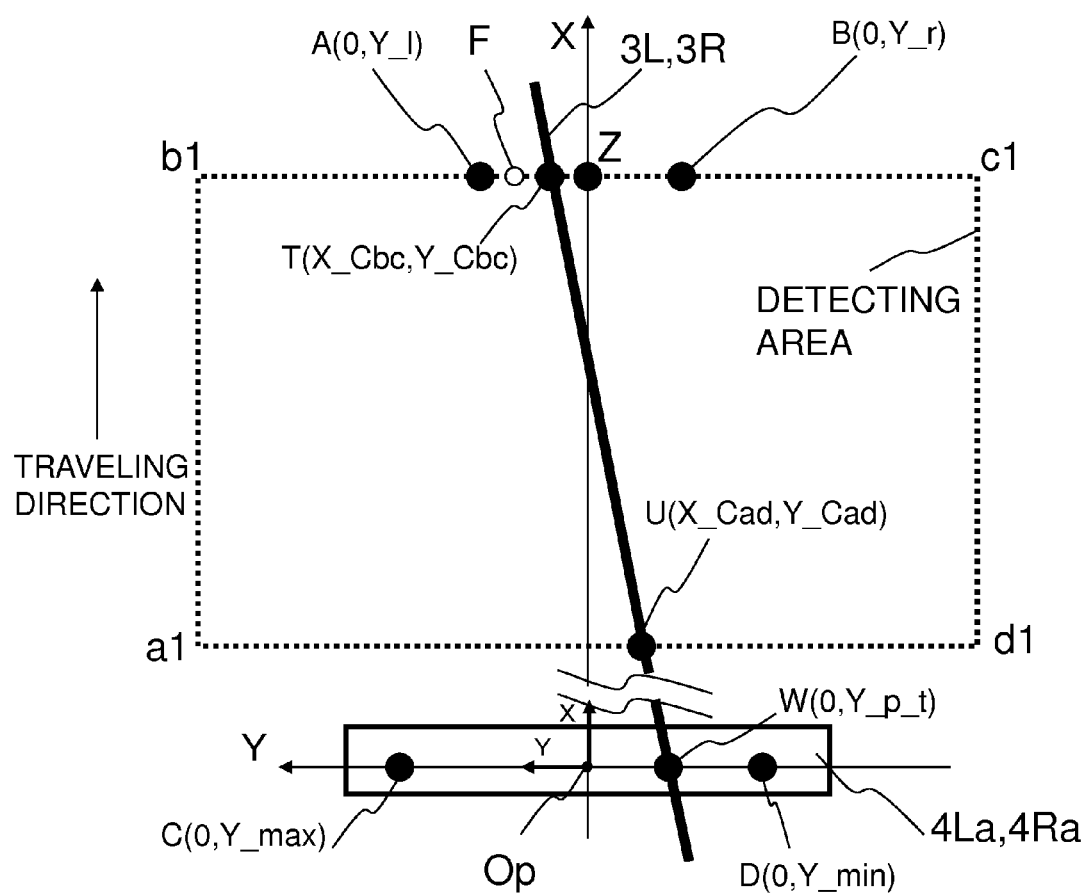
FIG. 21 is a schematic diagram similar to FIG. 19, showing the trolley wire detecting area and the coordinate system in a case where a dead zone is set.

FIG. 21 is a schematic diagram similar to FIG. 19, wherein a dead zone of the trolley wire tracing control has been set. The target points T and U and the representative point Z have been set for the detecting area a1, b1, c1, d1 as explained above. Further, points A and B specifying the dead zone of the trolley wire tracing control have been set at positions a prescribed distance (first threshold value) apart (Y_l, Y_r) from the representative point Z.

The vehicle state quantity calculation unit 50b executing the trolley wire tracing control sets the dead zone for the deviation Y_Cbc between the representative point Z and the target point T and calculates the state quantities of the trolley wire tracing control only when the deviation has gone outside the dead zone. The vehicle state quantity control unit 50c calculates the yaw moment correction value corresponding to the Y-coordinate value Y_Cbc of the target point T (i.e., the deviation between the representative point Z and the target point T).

The vehicle state quantity control unit 50c also determines the yaw moment control mode which has been explained referring to FIG. 8. The aforementioned yaw moment control unit 102 of the controller 100 calculates the motor torque command values and the steerage torque correction value based on the yaw moment correction value and the yaw moment control mode determined by the vehicle state quantity control unit 50c and then outputs the motor torque command values and the steerage torque correction value to the inverter control device 30 and the steering control device 32, respectively.

With the configuration and operation described above, the control device (made up of the vehicle control device 50, the controller 100, the inverter control device 30 and the steering control device 32) executes control to give an appropriate yaw moment to the vehicle 1 so that the vehicle 1 travels while tracing the trolley wires 3R and 3L. In this case, the control device carries out control to give an appropriate yaw moment to the vehicle 1 so that the representative point Z approaches the target point T. Further, the control device carries out control to give an appropriate yaw moment to the vehicle 1 so that the inclination θ_t decreases.

Besides the simple gain control shown in FIG. 20, integral control, derivative control, etc. may also be employed.

<Vehicle Meandering Control>

Further, the vehicle state quantity calculation unit 50b and the vehicle state quantity control unit 50c carry out the vehicle meandering control for dispersing (uniformizing) the wearing of the sliders 4Ra and 4La when the deviation Y_Cbc between the representative point Z and the target point T is within the dead zone of the trolley wire tracing control (i.e., between the points A and B). In this vehicle meandering control, a fluctuating point (indicated with the reference character "F" in FIG. 21) is newly defined and the yaw moment control is executed so that the representative point Z coincides with the fluctuating point F.

For the vehicle meandering control, the vehicle state quantity calculation unit 50b calculates the deviation between the representative point Z and the fluctuating point F. Since the Y-coordinate value (Y_c) of the fluctuating point F equals the deviation between the representative point Z and the fluctuating point F, the vehicle state quantity calculation unit 50b regards the Y-coordinate value Y_c of the fluctuating point F as the deviation between the representative point Z and the fluctuating point F. The deviation Y_c takes on a positive/negative value when the vehicle has shifted rightward/leftward with respect to the fluctuating point F.

The vehicle state quantity control unit 50c calculates the yaw moment correction value (for making the representative point Z coincide with the fluctuating point F) by using the deviation Y_c between the representative point Z and the fluctuating point F. In this case, the yaw moment correction value can be calculated as below.

$$\text{yaw moment correction value} = \text{gain} \times Y\_c \quad (2)$$

Figure 22:
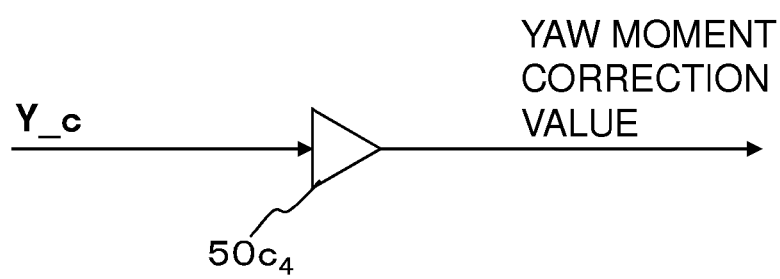
FIG. 22 is a block diagram showing the details of a function of the vehicle state quantity control unit (flow of calculation of a yaw moment correction value for making a representative point coincide with a fluctuating point).

In other words, the representative point Z is moved according to the expression (2) so that it constantly coincides with the fluctuating point F. FIG. 22 is a block diagram showing this process. A conversion unit 50c₄ converts the deviation Y_c into the yaw moment correction value by multiplying the deviation Y_c by a gain factor. The yaw moment correction value is outputted to the yaw moment control unit 102 and a yaw moment is given to the vehicle. The vehicle state quantity control unit 50c continues outputting the yaw moment correction value as long as the representative point Z does not coincide with the fluctuating point F.

The vehicle state quantity calculation unit 50b sets the fluctuating point F for the vehicle meandering control with respect to the target point T (Y_Cbc) as follows:

$$Y\_c = Y\_Cbc + j \times \sin(\theta) \quad (3)$$

The second term of the expression (3) is a term for making the vehicle fluctuate in the direction orthogonal to the traveling direction. According to the term, the fluctuating point F fluctuates around the target point T (Y_Cbc). Since the fluctuating point F is set as above and the yaw moment is given to the vehicle so as to make the representative point Z coincide with the fluctuating point F as explained above, the vehicle travels while meandering around the center of the trolley wires 3R and 3L as a consequence.

In this embodiment, a sinusoidal wave is employed as the second term of the above expression (3). This is of course for the purpose of making the sliders 4Ra and 4La evenly contact the trolley wires 3R and 3L to prevent the uneven wear of the sliders 4Ra and 4La and the trolley wires 3R and 3L. Mathematical functions capable of achieving this purpose include not only trigonometric functions but also trapezoidal waves, triangular waves, etc., and thus any function having a certain period may be employed. It is also possible to use a first order lowpass filter to prevent sharp changes in the deviation Y_c and construct the system by setting the time constant so that the yaw angle response speed of the vehicle in response to the yaw moment is not exceeded.

<Slider Elevation Control>

The vehicle state quantity calculation unit 50b calculates the inclination $\theta\_t$ of the vehicle at a certain time t. As mentioned above, this inclination $\theta\_t$ can be calculated according to the above expression (1) by using the coordinate values of the two target points T and U shown in FIG. 19.

Further, the vehicle state quantity calculation unit 50b calculates the Y-coordinate (Y_p_t) of a point W which is defined as the intersection point of the slider 4Ra/4La and the trolley wire 3R/3L.

The Y-coordinate Y_p_t of the point W can be approximated as follows:

$$Y\_p\_t = Y\_Cbc - \theta\_t \times X\_Cbc \text{ or}$$

$$Y\_p\_t = Y\_Cad - \theta\_t \times X\_Cad \quad (4)$$

Here, Y_P_t+1 as the value of Y_p_t one step later (after a time interval Δ) is expressed by using the vehicle speed V as follows:

$$Y\_p\_t+1 = Y\_p\_t + V \times \tan\theta\_t \quad (5)$$

Assuming that the permissible range of the Y-coordinate Y_p_t of the point W on the slider 4Ra/4La, within which the slider 4Ra/4La is in contact with the trolley wire 3R/3L and satisfactory electric power can be acquired continuously, is Y_min (Y-coordinate of a point D)<Y_p_t<Y_max (Y-coordinate of a point C) between points C and D, it can be said that there is no problem with elevating the slider 4Ra/4La in a range satisfying Y_min<Y_p_t+1<Y_max.

At the present time t, the vehicle state quantity calculation unit 50b judges whether or not the Y-coordinate Y_p_t of the point W will be outside the range between Y_min (Y-coordinate of the point D) and Y_max (Y-coordinate of the point C) in the next control step t+1, and outputs the result of the judgment to the vehicle state quantity control unit 50c. If the Y-coordinate Y_p_t of the point W will be outside the range between Y_min (Y-coordinate of the point D) and Y_max (Y-coordinate of the point C), the vehicle state quantity control unit 50c outputs a command signal for lowering the sliders 4Ra and 4La or prohibiting the elevation of the sliders 4Ra and 4La. In contrast, if the Y-coordinate Y_p_t will be within the range, the vehicle state quantity control unit 50c outputs a command signal for elevating the sliders 4Ra and 4La or permitting the elevation of the sliders 4Ra and 4La. The vehicle state quantity control unit 50c may also correct the reaction force of the reaction force motor 42 (see FIG. 5) of the steering device 40 depending on the Y-coordinate Y_p_t of the point W. For example, the correction may be made to decrease the reaction force in the range satisfying Y_min<Y_p_t+1<Y_max and to increase the reaction force in the ranges satisfying Y_p_t+1≤Y_min or Y_max≤Y_p_t+1.

In this example, the vehicle control device 50 is executing both the trolley wire tracing control and the slider elevation control. In the trolley wire tracing control, the vehicle state quantity control unit 50c outputs the yaw moment correction value calculated by multiplying the deviation Y_Cbc or the inclination $\theta\_t$ by a gain factor. Since the outputting of the yaw moment correction value continues until the deviation Y_Cbc or the inclination $\theta\_t$ becomes 0, the Y-coordinate Y_p_t of the point W on the slider 4Ra/4La and the inclination $\theta\_t$ of the vehicle tend to converge on 0 eventually.

<Details of Control Process by Vehicle Control Device 50>

Figure 23:
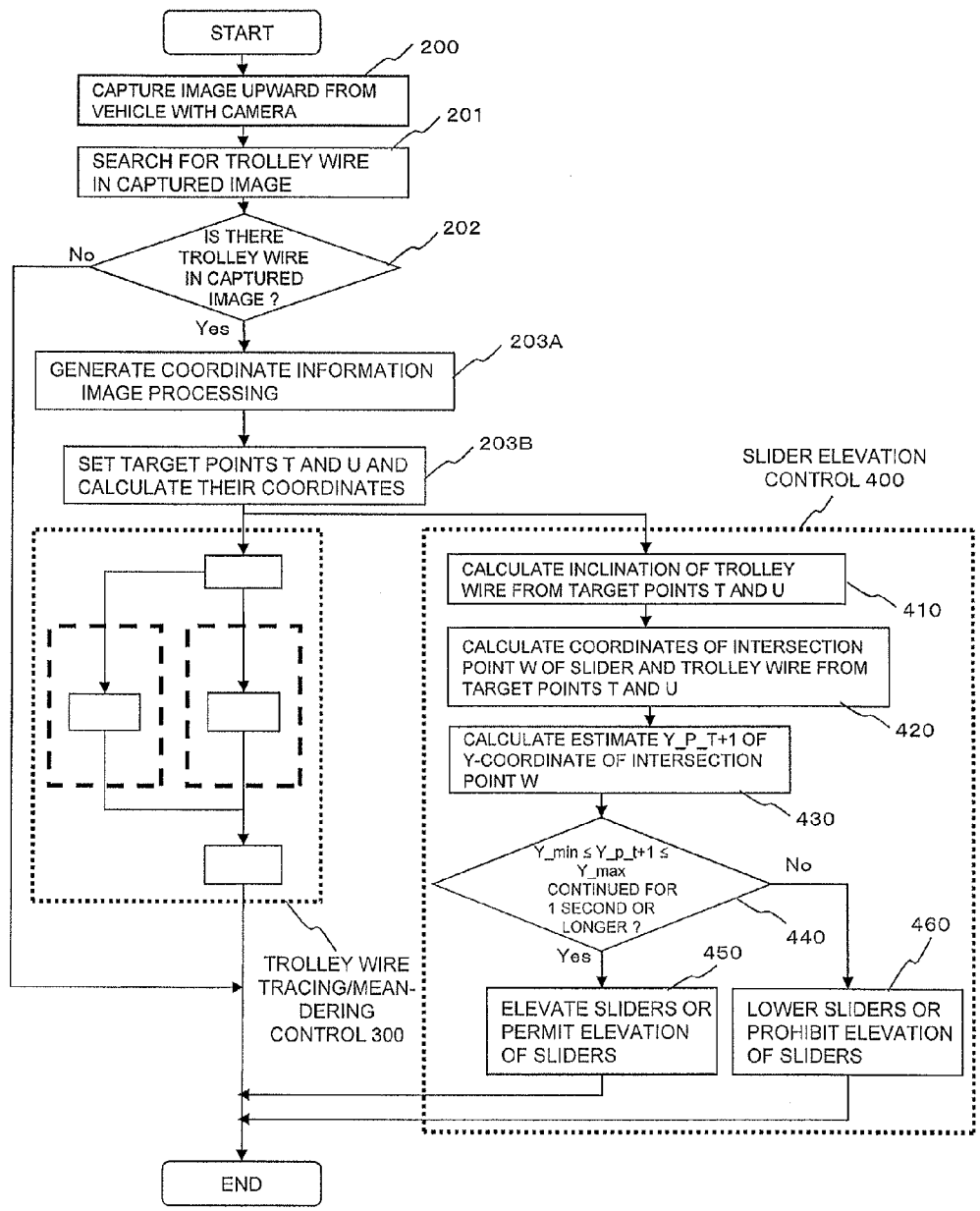
FIG. 23 is a flow chart showing a process flow from upward shooting with the camera to control output in an example of the vehicle control device.
Figure 24:
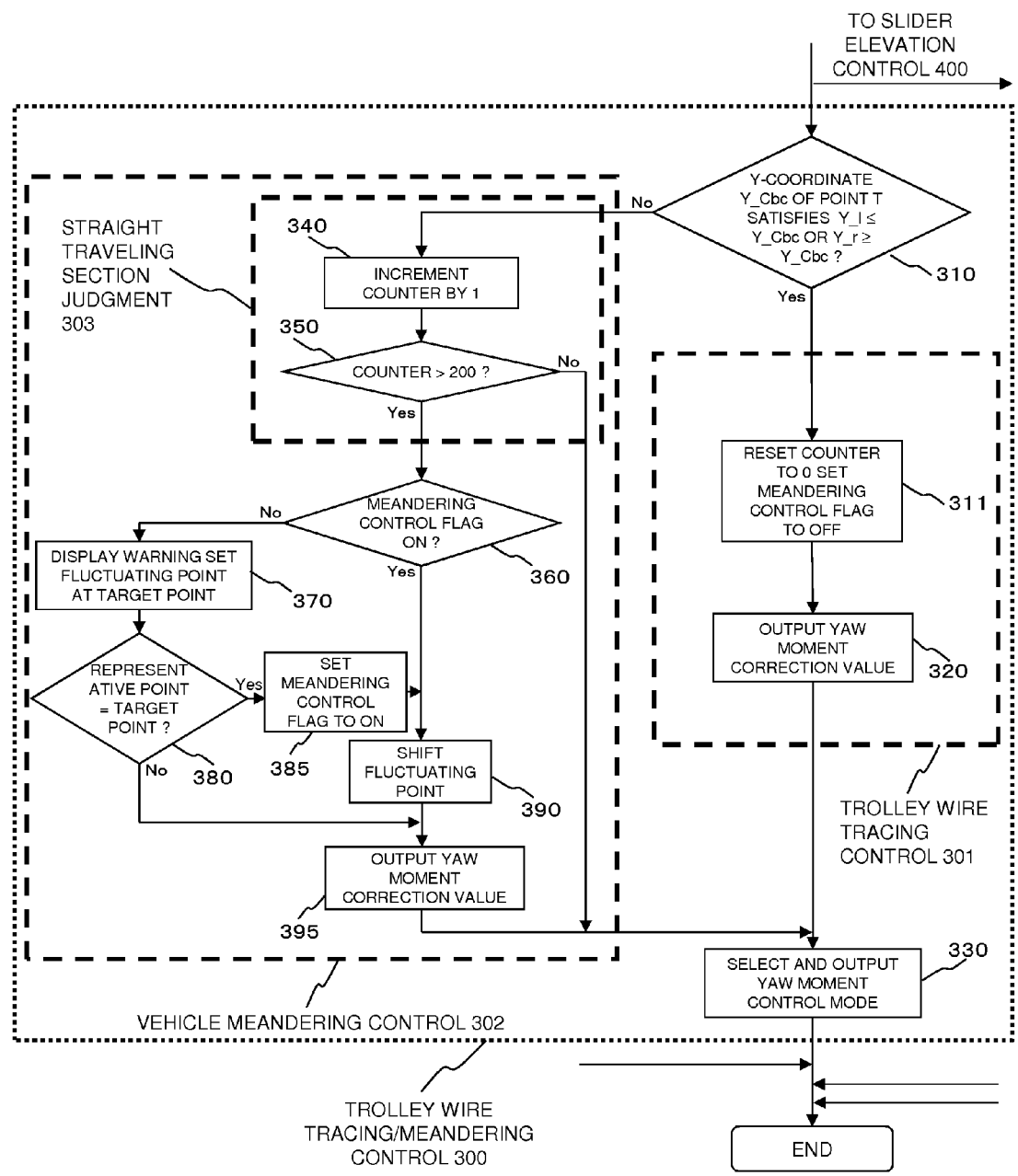
FIG. 24 is a flow chart showing the details of a trolley wire tracing/meandering control step 300 shown in FIG. 23.

The details of the control process executed by the vehicle control device 50, including the aforementioned elevation control of the sliders 4Ra and 4La, will be explained below referring to flow charts of FIGS. 23 and 24. FIG. 23 is a flow chart showing the flow of the process from the upward shooting with the camera to the control output. FIG. 24 is a flow chart showing the details of a trolley wire tracing/meandering control step 300 shown in FIG. 23. It is assumed as shown in FIG. 12 that a camera is set in front of the vehicle 1 to be on the extension line of the vehicle axis and the number of trolley wires shot with the camera is one.

In the first step 200 in FIG. 23, the image information processing unit 50a captures an image upward from the vehicle 1 with the camera. In step 201, the image information processing unit 50a searches the captured image for the trolley wire 3R/3L. In the search in the step 201, the whole area of the captured image is searched when the detection of the trolley wire 3R/3L is carried out for the first time. After the trolley wire 3R/3L has been detected once, searching the whole area is unnecessary; searching only a limited area in the vicinity of the coordinates of the already detected trolley wire 3R/3L is effective since it leads to reduction of the search time. In step 202, the image information processing unit 50a judges whether or not there exists an object corresponding to the trolley wire 3R/3L in the captured image. If no object corresponding to the trolley wire 3R/3L is found, the process is finished. If there exists an object corresponding to the trolley wire 3R/3L, the process advances to step 203A. In the step 203A, the image information processing unit 50a executes the edge extraction and the image processing for calculating the center line of the trolley wire 3R/3L.

Thereafter, the process is handed over to the vehicle state quantity calculation unit 50b. In step 203B, the vehicle state quantity calculation unit 50b sets the aforementioned target points T and U and calculates the coordinates of the target points T and U. At this point, the process using the coordinate information on the target points T and U separates into two flows: the trolley wire tracing/meandering control step 300 with respect to the trolley wire 3R/3L and an elevation control step 400 for controlling the elevation of the slider 4Ra/4La.

<Trolley Wire Tracing/Meandering Control>

First, the trolley wire tracing/meandering control step 300 will be explained below referring to FIG. 24.

In step 310, the vehicle state quantity calculation unit 50b judges whether or not the target point T exists between the points A and B (Y_l≤Y_Cbc, Y_r≥Y_Cbc) which have been set at positions a prescribed distance apart (Y_l, Y_r) from the representative point Z shown in FIG. 21. When the target point T does not exist between the points A and B, that is, when the deviation Y_Cbc has gone outside the dead zone, a trolley wire tracing control step 301 is executed. When the target point T exists between the points A and B, that is, when the deviation Y_Cbc is within the dead zone, a vehicle meandering control step 302 is executed.

<Trolley Wire Tracing Control>

In the trolley wire tracing control step 301, control is performed to give a yaw moment to the vehicle 1 to let the vehicle 1 travel while tracing the trolley wires (to keep the target point T between the points A and B) in order to prevent the vehicle 1 from deviating from the trolley traveling lane since there is a possibility of the trouble (deviation from the trolley traveling lane) if the vehicle continues traveling with the deviation Y_Cbc remaining outside the dead zone.

First, in step 311, the vehicle state quantity calculation unit 50b resets a counter (for counting the length of time for which the Y-coordinate Y_Cbc of the target point T remains between the points A and B) to 0 and sets a meandering control flag to OFF.

Thereafter, the process advances to step 320, in which the vehicle state quantity control unit 50c calculates and outputs the yaw moment correction value.

Figure 25:
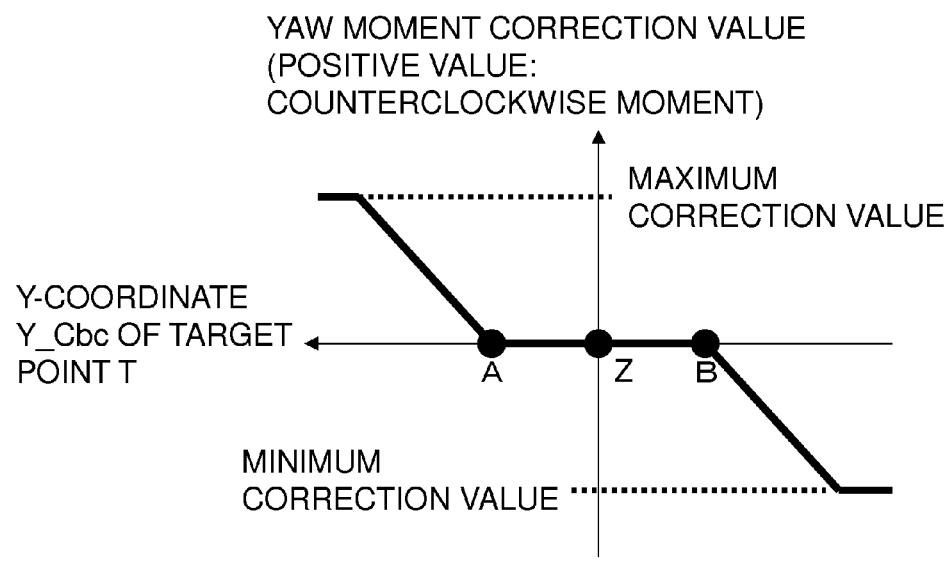
FIG. 25 is a schematic diagram showing an example of a method for calculating the yaw moment correction value in step 320 in FIG. 24.

FIG. 25 is a schematic diagram showing an example of a method for calculating the yaw moment correction value employed in the step 320. As mentioned above, the Y-coordinate value Y_Cbc of the target point T in front of the slider 4Ra/4La equals the deviation between the representative point Z and the target point T. In FIG. 25, the gradient of the characteristic lines outside the points A and B corresponds to the gain of the conversion unit $50c_2$ shown in FIG. 20.

As shown in FIGS. 25 and 20, a yaw moment correction value corresponding to the Y-coordinate value Y_Cbc of the target point T (corresponding to the deviation between the representative point Z and the target point T) is calculated outside the points A and B. Specifically, in the range outside the point A (where Y_Cbc is positive), the yaw moment correction value is increased with the increase in Y_Cbc. In the range outside the point B (where Y_Cbc is negative), the yaw moment correction value is decreased with the decrease in Y_Cbc. According to this calculation, when the target point T does not exist between the points A and B (i.e., when the absolute value of the deviation Y_Cbc between the representative point Z and the target point T is greater than the absolute value of the Y-coordinate value Y_l of the point A or the Y-coordinate value Y_r of the point B as the first threshold value), control is executed to give an appropriate yaw moment to the vehicle 1 so as to make the representative point Z approach the target point T. Further, the control is executed so that the yaw moment given to the vehicle 1 increases with the increase in the absolute value of the deviation Y_Cbc. After the yaw moment correction value has reached a maximum correction value or a minimum correction value, the yaw moment correction value is set constant in order to prevent abrupt/extreme turning of the vehicle. Incidentally, it is also possible to output a constant yaw moment correction value in such cases where the target point T does not exist between the points A and B, instead of calculating and outputting the yaw moment correction value as a variable.

Here, the reason for setting the yaw moment correction value at 0 between the points A and B shown in FIG. 25 will be explained. By the control for making the representative point z coincide with the target point T, the point W is positioned almost at the center of the slider 4Ra/4La as long as the vehicle 1 is traveling forward. In this case, however, the yaw moment correction value is calculated even when the point W has slightly shifted from the center of the slider 4Ra/4La and that increases the frequency of operation of the actuators implementing the yaw moment correction (the reaction force motor 42 and the steerage motor 43 of the steering device 40 (FIG. 5) and the rear wheel electric motors 6R and 6L (FIG. 3) in this embodiment). By setting the yaw moment correction value at 0 between the points A and B, the frequency of operation of the rear wheel electric motors 6R and 6L can be reduced and high control stability and riding comfort can be secured. The width of the range between the points A and B (in which the yaw moment correction is unnecessary) may be set depending on the width of the slider 4Ra/4La.

Further, by executing the control so as to increase the yaw moment given to the vehicle 1 with the increase in the absolute value of the deviation Y_Cbc, the vehicle 1 is given the yaw moment so that trolley wires 3R and 3L quickly return to the center of the sliders 4Ra and 4La when the slider 4Ra/4La of the traveling vehicle is about to widely deviate from the trolley wire 3R/3L in the lateral direction. Consequently, the dump truck can securely be prevented from deviating from the lane with the trolley wires 3R and 3L.

In the next step 330, the yaw moment control mode is selected and outputted. In normal traveling, the mode "1" is selected as the yaw moment control mode since there is no request for reducing the vehicle speed (driver's retarder operation or deceleration by other control).

<Another Example of Trolley Wire Tracing Control>

Figure 26:
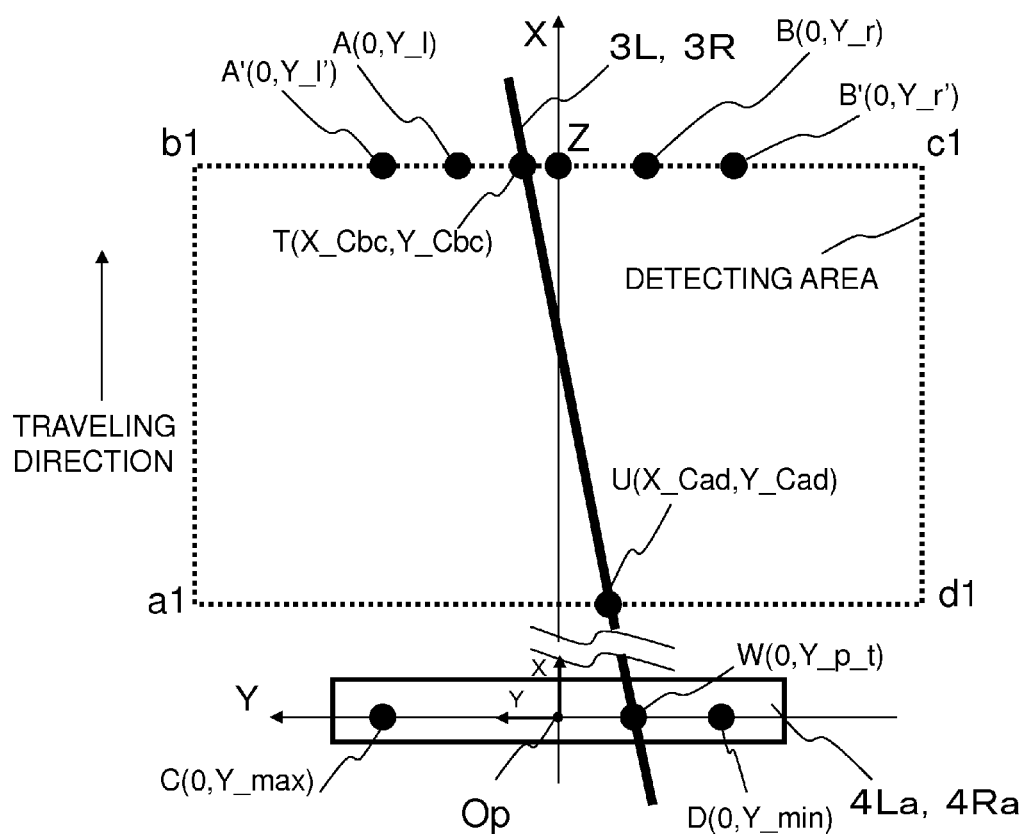
FIG. 26 is a schematic diagram similar to FIGS. 19 and 21, wherein deviation monitoring points for the trolley wire tracing control have been set.
Figure 27:
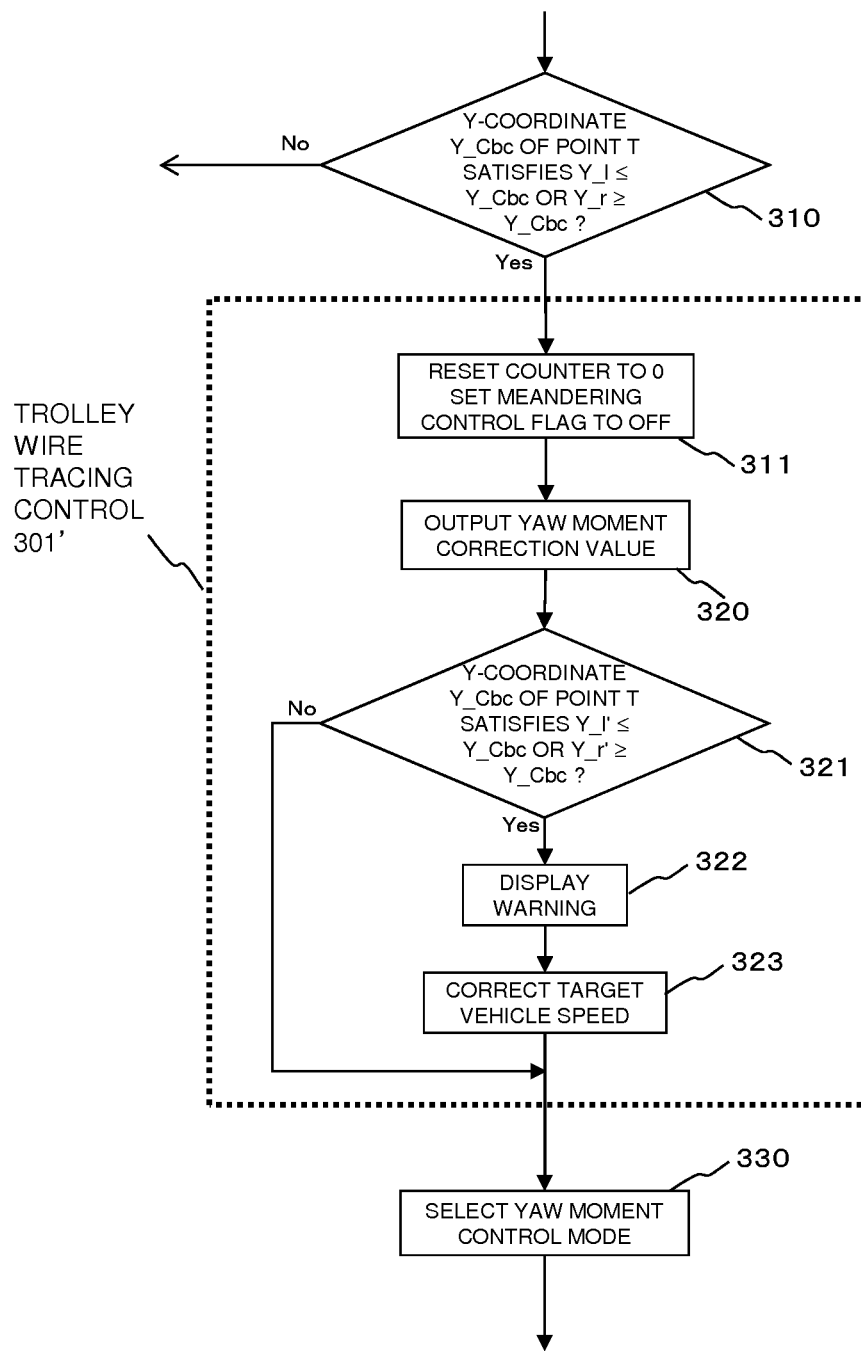
FIG. 27 is a flow chart showing a process flow from the upward shooting with the camera to the control output in another example of the vehicle control device.

Next, another example of the trolley wire tracing control will be explained below referring to FIGS. 26-29. FIG. 26 is a schematic diagram similar to FIGS. 19 and 22, wherein deviation monitoring points for the trolley wire tracing control have been set. FIG. 27 is a flow chart showing step 301' which is executed instead of the trolley wire tracing control step 301 in the flow chart of FIG. 24.

As shown in FIG. 26, a point A' (second threshold value) at a position outside (with a larger Y-coordinate value than) the point A and with a Y-coordinate value Y_l' and a point B' (second threshold value) at a position outside (with a smaller negative Y-coordinate value than) the point B and with a Y-coordinate value Y_r' have been set as the deviation monitoring points for the trolley wire tracing control.

In FIG. 25, the process till the step 320 for calculating the yaw moment correction value is identical with that in FIGS. 23 and 24 explained above. In step 321 after the step 320, whether the target point T is situated between the points A' and B' (Y_l'≤Y_Cbc, Y_r'≥Y_Cbc) or not is judged (step 321). If affirmative, a warning for urging the driver to correct the steering is issued by sound and/or display (step 322) since there is a possibility that the vehicle deviates from the trolley lane.

Figure 28:
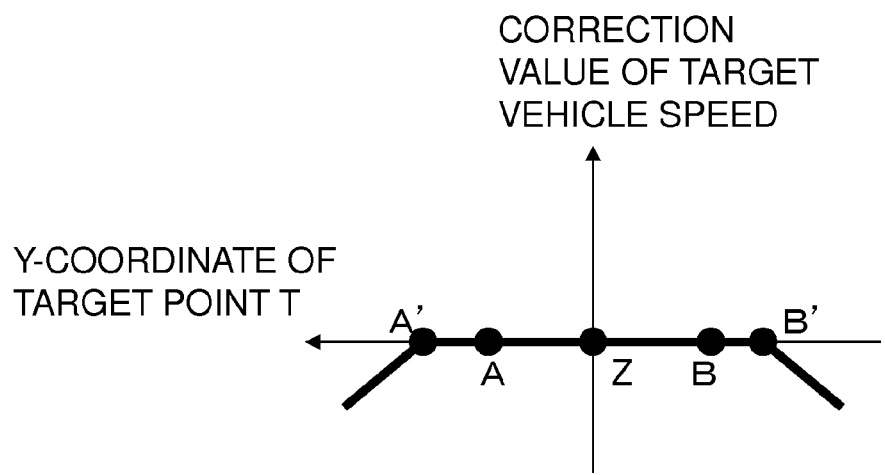
FIG. 28 is a schematic diagram showing an example of a method for calculating a target vehicle speed correction value when a target vehicle speed is corrected depending on the position of a target point T in step 323 in FIG. 27.

In the next step 323, the target vehicle speed is corrected depending on the position of the target point T. FIG. 28 is a schematic diagram showing an example of a method for calculating a target vehicle speed correction value in this case. As shown in FIG. 28, when the target point T does not exist between the points A' and B', the target vehicle speed correction value is calculated so as to reduce the target vehicle speed depending on the degree of deviation from the points A' and B'. Specifically, in the range outside the point A' (where Y_Cbc is positive), the correction value on the side of decreasing the target vehicle speed is increased with the increase in Y_Cbc. In the range outside the point B' (where Y_Cbc is negative), the correction value on the side of decreasing the target vehicle speed is decreased with the decrease in Y_Cbc. According to this calculation, when the target point T does not exist between the points A' and B' (i.e., when the absolute value of the deviation Y_Cbc between the representative point Z and the target point T is greater than the absolute value of the Y-coordinate value Y_l' of the point A' or the Y-coordinate value Y_r' of the point B' as the second threshold value), control is executed to decrease the traveling speed with the increase in the absolute value of the deviation Y_Cbc. Decreasing the vehicle speed as above is effective for lightening the operating load on the driver and giving a feeling of security to the driver.

Figure 29:
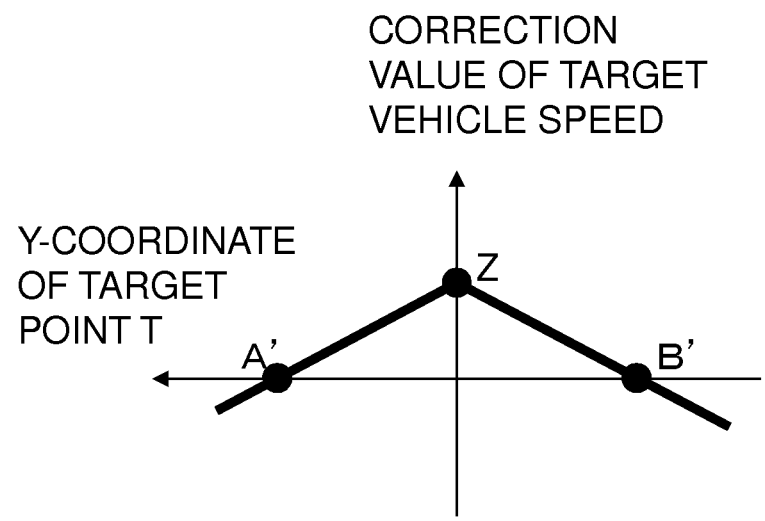
FIG. 29 is a schematic diagram showing another example of the method for calculating the target vehicle speed correction value when the target vehicle speed is corrected depending on the position of the target point T in the step 323 in FIG. 27.

FIG. 29 is a schematic diagram showing another example of the method for calculating the target vehicle speed correction value. As shown in FIG. 29, when the target point T exists between the points A' and B', the correction may be made to increase the target vehicle speed as target point T approaches the representative point Z. Specifically, in the range inside the point A' (where Y_Cbc is positive), the correction value on the side of increasing the target vehicle speed is increased with the decrease in Y_Cbc. In the range inside the point B' (where Y_Cbc is negative), the correction value on the side of increasing the target vehicle speed is decreased with the increase in Y_Cbc. According to this calculation, when the target point T exists between the points A' and B' (i.e., when the absolute value of the deviation Y_Cbc between the representative point Z and the target point T is less than the absolute value of the Y-coordinate value Y_l' of the point A' or the Y-coordinate value Y_r' of the point B' as the second threshold value), control is executed to increase the traveling speed with the decrease in the absolute value of the deviation Y_Cbc. Increasing the vehicle speed as above is effective for increasing the working efficiency.

Figure 30:
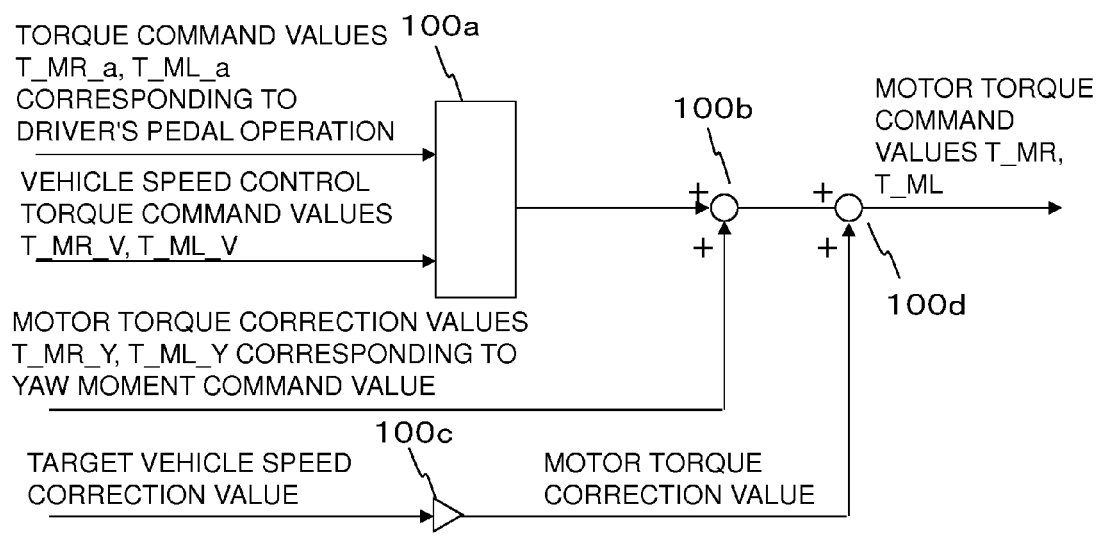
FIG. 30 is a schematic diagram similar to FIG. 10, showing a method for generating motor torque based on the target vehicle speed correction value.

FIG. 30 is a schematic diagram similar to FIG. 10, showing a method for generating motor torque according to the target vehicle speed correction value. As shown in FIG. 30, the target vehicle speed correction value calculated as above is converted into a motor torque correction value by a conversion unit 100c by multiplying the target vehicle speed correction value by a gain factor. Subsequently, the motor torque command values T_MR and T_ML are calculated by a calculation unit 100d by adding the motor torque correction value (corresponding to the target vehicle speed correction value) calculated by the conversion unit 100c to the motor torque command values calculated by the calculation unit 100b (acquired by adding the motor torque correction values T_MR_Y and T_ML_Y corresponding to the yaw moment command value generated by the yaw moment control unit 102 (FIG. 8) to the torque command values selected by the processing unit 100a).

Next, the yaw moment control mode in the case where the target vehicle speed is corrected to a lower value according to the target vehicle speed correction value shown in FIG. 28 will be explained. As shown in FIG. 9, in cases where a yaw moment has to be generated when the right and left motors are outputting 100% motor torque, it is necessary to reduce the motor torque of one of the right and left motors. The reduction of the motor torque of one of the motors leads to a drop in the vehicle speed since the vehicle cannot maintain the present speed with the reduced motor torque. Thus, in cases where the target vehicle speed is corrected to a lower value, the yaw moment correction may be made not by the steerage torque correction but by the correction of the motor torque, by which both the control of giving a yaw moment to the vehicle 1 by controlling the right and left electric motors 6R and 6L and the control of the traveling speed are carried out. Consequently, efficient control, achieving both the deceleration and the generation of the yaw moment at the same time, can be carried out.

<Vehicle Meandering Control>

In the vehicle meandering control step 302, the control for giving a yaw moment to the vehicle 1 so as to make the vehicle travel while meandering around the center of the trolley wires is carried out in order to prevent the uneven wearing of the sliders caused by the concentration of the contact point between each slider and the corresponding trolley wire at/around the same point.

Setting the conditions of the meandering control while the trolley wires (on which the vehicle is currently traveling) are straight (especially straight in the trolley traveling section) and the vehicle is traveling straight along the trolley wires is desirable and leads to high accuracy of the meandering control. Therefore, a process for judging whether the vehicle is traveling straight with respect to the trolley wires or not is executed first.

First, in step 340 in a straight traveling section judgment step 303, the vehicle state quantity calculation unit 50b counts the length of time for which the Y-coordinate value Y_Cbc of the target point T exists between the points A and B. The counted time is added to the counter and then the process advances to step 350. For example, assuming that this process is executed every 10 milliseconds in the control flow of FIG. 24, the process is repeated until the counter reaches 200 in a case where a judgment is made to check whether or not the target point T remains between the points A and B for two seconds or more.

In the next step 350, whether the counter has reached 200 or not is judged. If the counter has reached 200, the vehicle is judged to be traveling in a straight traveling section. In this case, the process advances to step 360 and concrete meandering control steps are started. The size (time) of the counter for the judgment in the step 350 may also be set 300 or greater, or less than 200 (for earlier judgment that the vehicle is traveling in a straight traveling section). When the counter is less than 200 in the step 350, the time of traveling in the straight traveling section is judged to be insufficient for setting the conditions of the meandering control and starting the meandering control. In this case, the process advances to step 330.

In the step 360, whether the meandering control flag is ON or not is judged. If the meandering control flag is ON (Yes), the process advances to step 390 since the meandering control is already in progress. If the meandering control flag is not ON (No), the process advances to step 370 and a warning is displayed. This warning is issued for prompting the driver to pay attention to the fact that the direction of the vehicle will be controlled automatically by setting the fluctuating point F at the target point T (i.e., the vehicle meandering control will be executed). Concurrently with the warning, the fluctuating point F is moved to the target point T, by which the vehicle is moved so as to position the trolley wires at the centers of the sliders. The control for moving the fluctuating point F to the target point T in this step 370 is performed as follows:

First, the Y-coordinate Y_c of the fluctuating point F is set equal to the Y-coordinate Y_Cbc of the target point T (Y_c=Y_Cbc). As mentioned above, the yaw moment correction value for making the representative point Z coincide with the fluctuating point F has already been calculated by the vehicle state quantity control unit 50c by using the deviation Y_c between the representative point Z and the fluctuating point F. Thus, the yaw moment control is performed according to the expression (2) so that the representative point Z coincides with the target point T. A series of movements of the representative point Z, the target point T and the fluctuating point F in this case will be illustrated in FIGS. 31-36. FIGS. 31-36 are schematic diagrams showing the positional relationship among the representative point Z, the target point T, the fluctuating point F, the points A and B, the range (side) a1-d1 and the trolley wire in this step 370.

Figure 31:
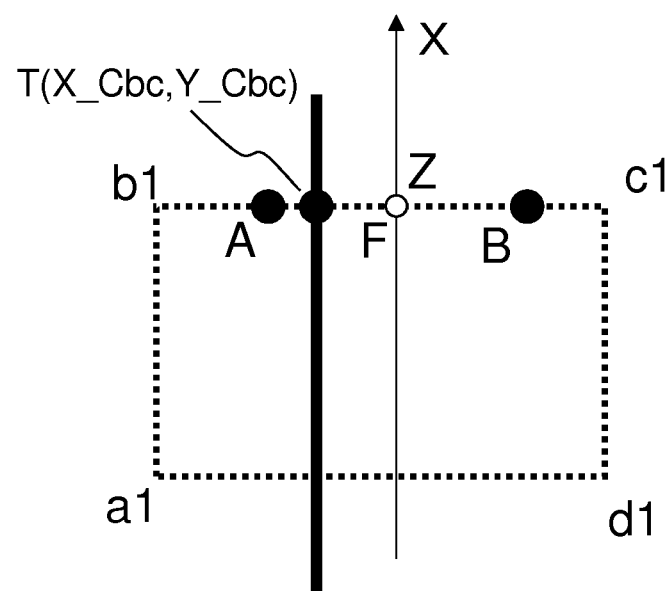
FIG. 31 is a schematic diagram showing a positional relationship among the representative point Z, the target point T, the fluctuating point F, points A and B, a range (side) a1-d1 and a trolley wire in step 370 in FIG. 24.
Figure 32:
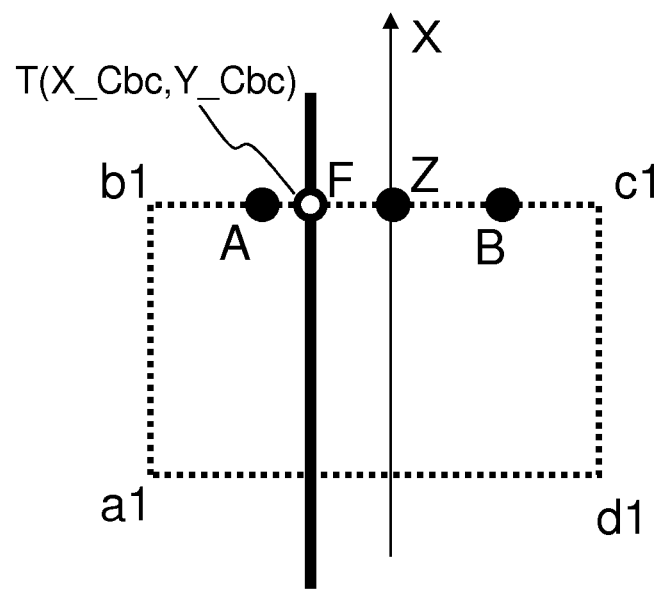
FIG. 32 is a schematic diagram showing a positional relationship among the representative point Z, the target point T, the fluctuating point F, the points A and B, the range (side) a1-d1 and the trolley wire in the step 370 in FIG. 24.
Figure 33:
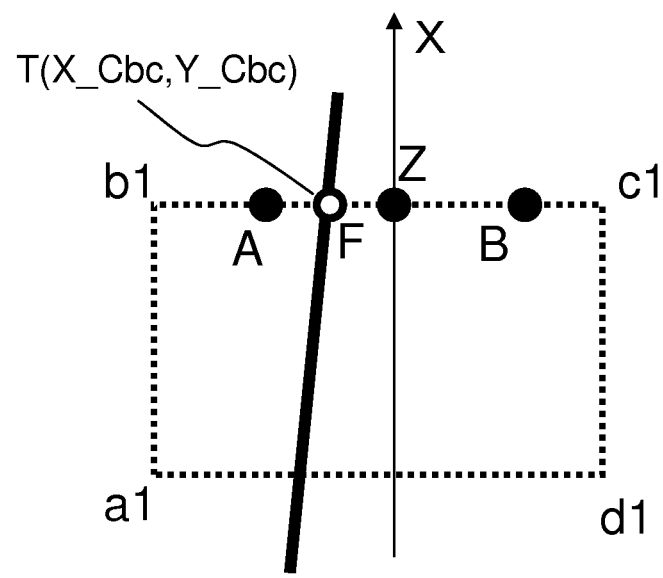
FIG. 33 is a schematic diagram showing a positional relationship among the representative point Z, the target point T, the fluctuating point F, the points A and B, the range (side) a1-d1 and the trolley wire in the step 370 in FIG. 24.
Figure 34:
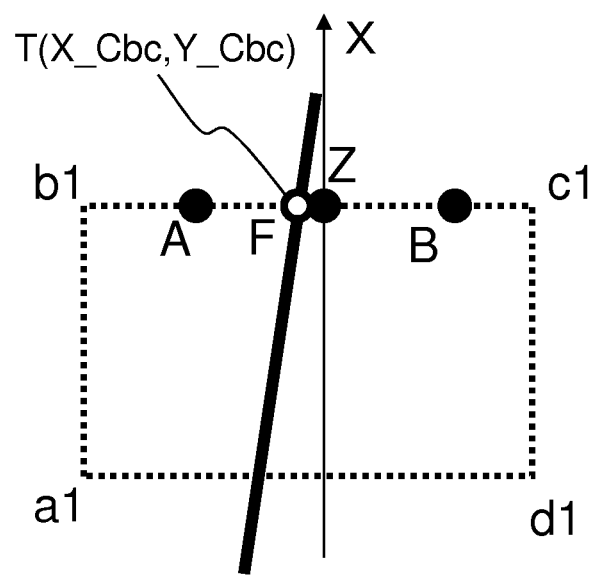
FIG. 34 is a schematic diagram showing a positional relationship among the representative point Z, the target point T, the fluctuating point F, the points A and B, the range (side) a1-d1 and the trolley wire in the step 370 in FIG. 24.
Figure 35:
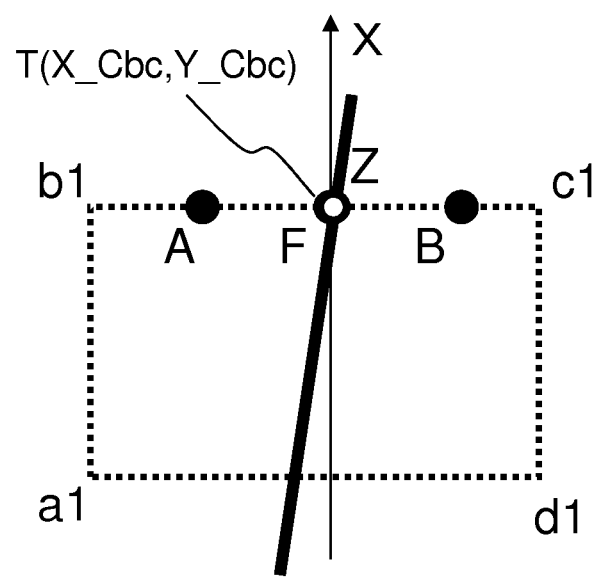
FIG. 35 is a schematic diagram showing a positional relationship among the representative point Z, the target point T, the fluctuating point F, the points A and B, the range (side) a1-d1 and the trolley wire in the step 370 in FIG. 24.
Figure 36:
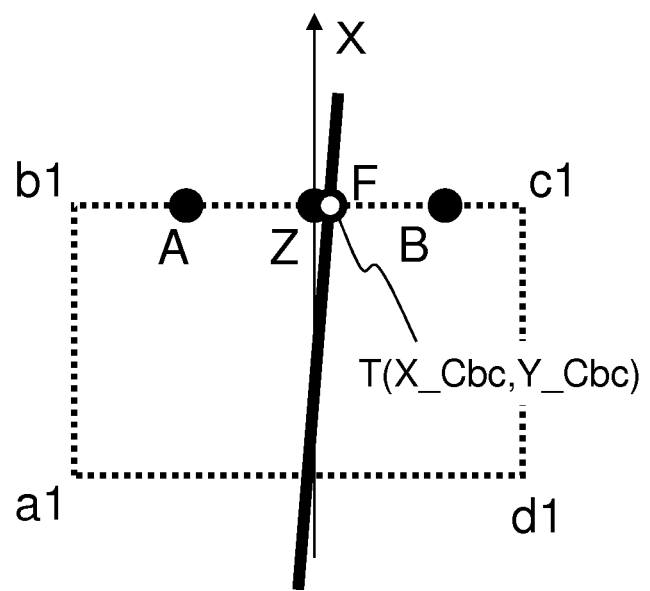
FIG. 36 is a schematic diagram showing a positional relationship among the representative point Z, the target point T, the fluctuating point F, the points A and B, the range (side) a1-d1 and the trolley wire in the step 370 in FIG. 24.

FIG. 31 shows a state in which the representative point Z and the fluctuating point F coincide with each other and the target point T is apart from the points Z and F but situated within the zone AB. As illustrated in FIG. 31, the vehicle 1 is traveling in parallel with the trolley wire. At this moment, if the fluctuating point F is set to coincide with the target point T as shown in FIG. 32, a yaw moment is given to the vehicle by the control device 200 according to the expression (2) so as to make the representative point Z coincide with the fluctuating point F. Thus, the representative point Z gradually approaches the target point T as shown in FIGS. 33 and 34 and temporarily coincides with the target point T as shown in FIG. 35. At this stage, the yaw moment correction value temporarily becomes 0 since the representative point Z coincides with the fluctuating point F (and also with the target point T). However, if the vehicle continues traveling in this state, the target point T naturally moves to the right-hand side as shown in FIG. 36 due to the inclination of the vehicle 1 with respect to the trolley wire. Such a simple multiplication by the gain factor according to the expression (2) leads to the hunting. To avoid the problem, the convergence is generally enhanced by making the representative point Z converge on the target point T by incorporating an integral control factor, a derivative control factor, etc. into the expression (2). Such a method allows the vehicle 1 to place its center directly under the trolley wires and to travel in parallel with the trolley wires, making it possible to start stable meandering control.

Figure 37:
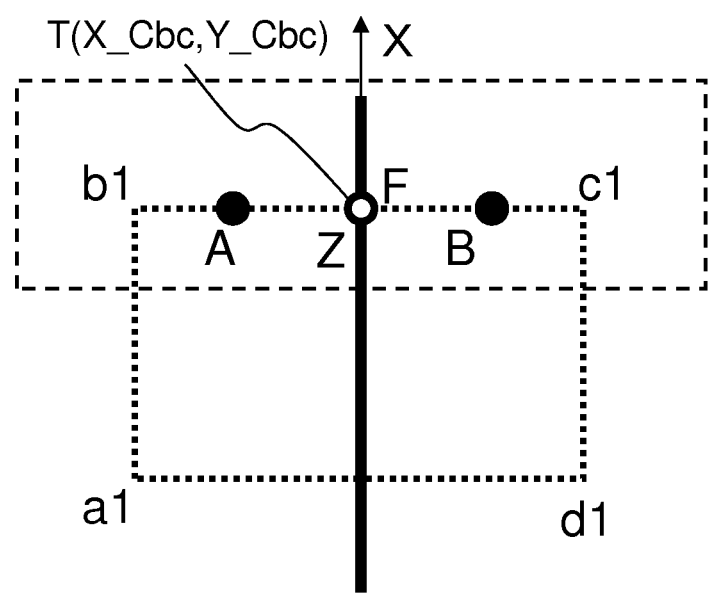
FIG. 37 is a schematic diagram showing a positional relationship among the representative point Z, the target point T, the fluctuating point F, the points A and B, the range (side) a1-d1 and the trolley wire in the step 370 in FIG. 24.

In the next step 380, it is judged whether or not the representative point Z, the target point T and the fluctuating point F coincide with one another and the vehicle is in parallel with the trolley wire as shown in FIG. 37. FIG. 37 is a schematic diagram similar to FIGS. 31-36, showing the positional relationship among the representative point Z, the target point T, the fluctuating point F, the points A and B, the range (side) a1-d1 and the trolley wire. If the judgment is negative (No), the process advances to step 395. If the judgment is affirmative (Yes), the process advances to step 385, the conditions for performing the vehicle meandering control are judged to be satisfied enough. In this case, the process advances to step 385 and the meandering control flag is turned ON. Thereafter, the process advances to the step 390.

In the step 390, the fluctuating point F for the vehicle meandering control is set as shown in the expression (3) and the coordinate value of the fluctuating point F is outputted to the vehicle state quantity control unit 50c. Thereafter, the process advances to the step 395.

Figure 38:
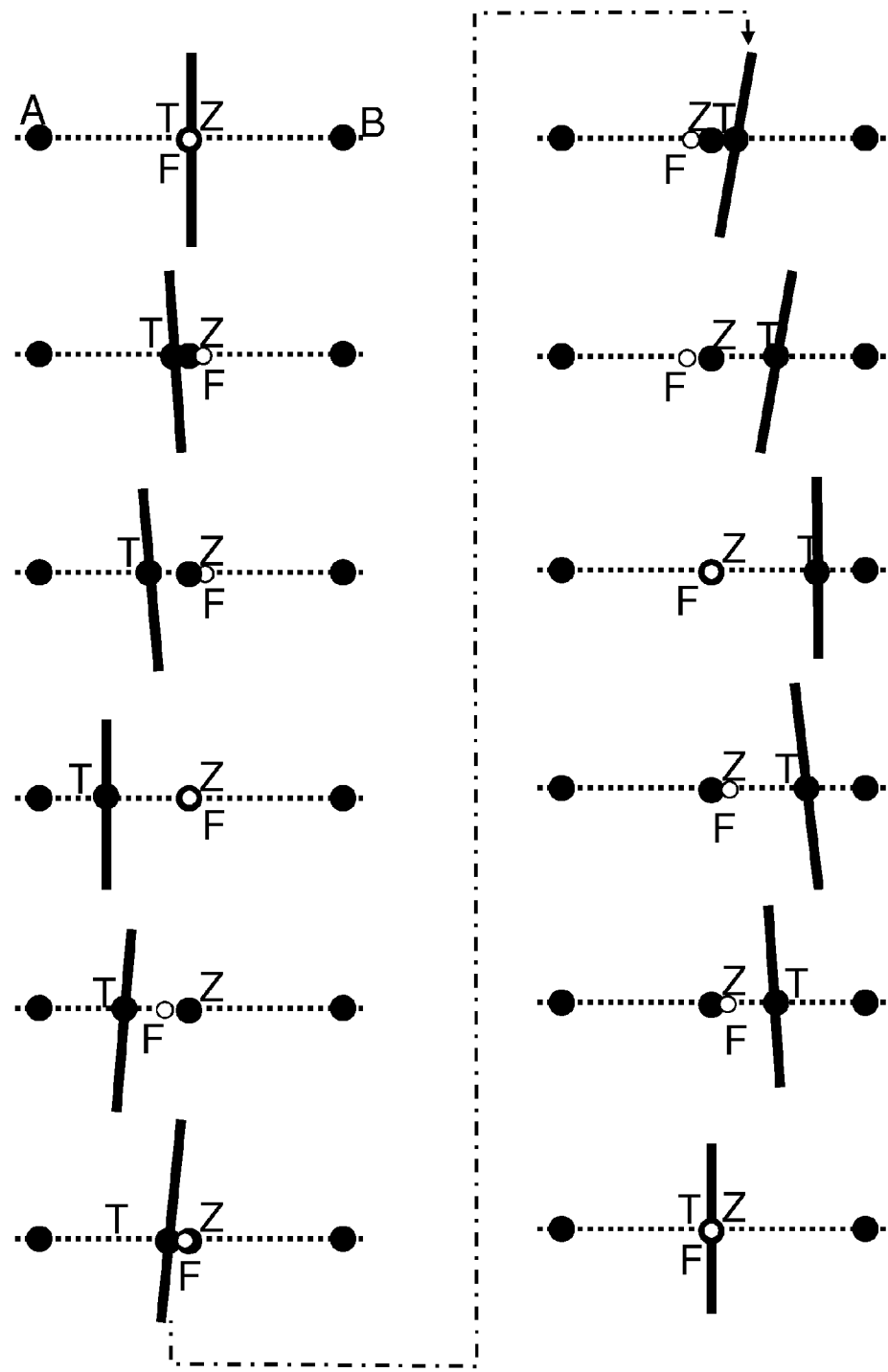
FIG. 38 is a schematic diagram showing the positional relationship among the representative point Z, the target point T, the fluctuating point F and the points A and B when vehicle meandering control is in progress.
Figure 39:
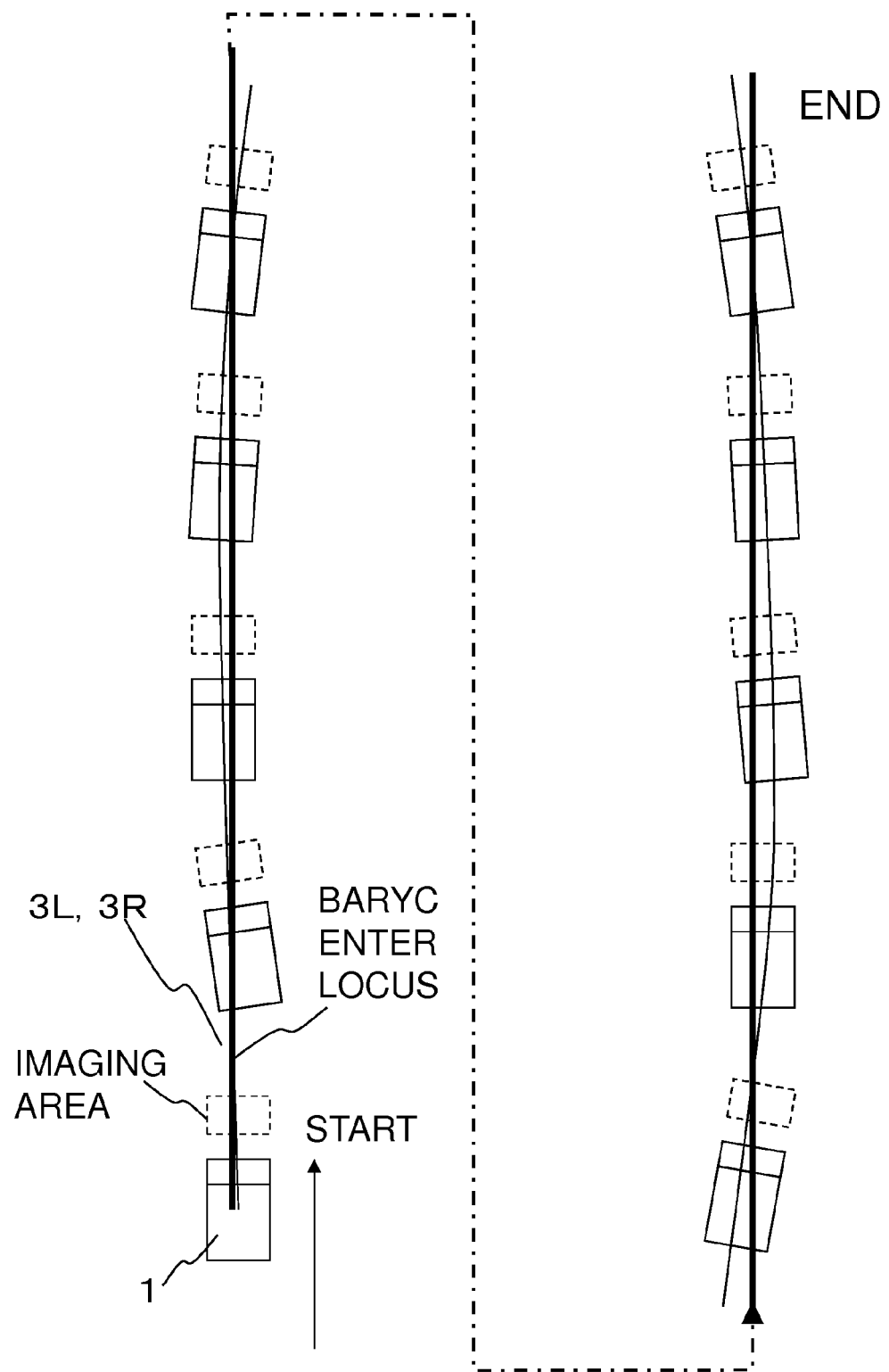
FIG. 39 is a schematic diagram showing the positional relationship between a vehicle and a trolley wire when the vehicle meandering control is in progress.

In the step 395, the vehicle state quantity control unit 50c calculates and outputs the yaw moment correction value according to the expression (2) so as to make the fluctuating point F and the representative point Z coincide with each other. Since the yaw moment is given to the vehicle 1 by the control device 200 to make the representative point z coincide with the fluctuating point F, the representative point Z representing the vehicle 1 is controlled to approach the fluctuating point F fluctuating around the target point T. This makes the vehicle travel while periodically fluctuating around the center of the trolley wires. Consequently, the vehicle travels while meandering around the center of the trolley wires. When the vehicle meandering control is executed as above, the relationship among the target point T, the representative point Z and the fluctuating point F changes as illustrated from the upper left to the lower right of FIG. 38. FIG. 38 is a schematic diagram showing the positional relationship among the representative point Z, the target point T, the fluctuating point F and the points A and B when the vehicle meandering control is in progress. As shown in FIG. 38, the amplitude j of the expression (3) is desired to be set within a range allowing the target point T to remain in the zone AB. As shown in FIG. 39, the vehicle meanders around the center of the trolley wires when viewed from above the trolley wires.

Next, in the step 330, the yaw moment control mode is selected and outputted. When the meandering control is in progress, generating the yaw moment by means of the steering is desirable since the drop in the vehicle speed can relatively be suppressed by this method. Thus, when the meandering control flag is ON, yaw moment correction by means of steering is carried out by setting the yaw moment control mode to "1". However, depending on the configuration of the vehicle, there are cases where the vehicle has no mechanism capable of correcting the steering angle. In such cases, the yaw moment may be generated by means of the driving force difference between the right and left motors.

The procedure is completed as explained above.

<Another Example of Vehicle Meandering Control>

Next, another example of the vehicle meandering control will be explained below referring to FIGS. 40-45.

Figure 40:
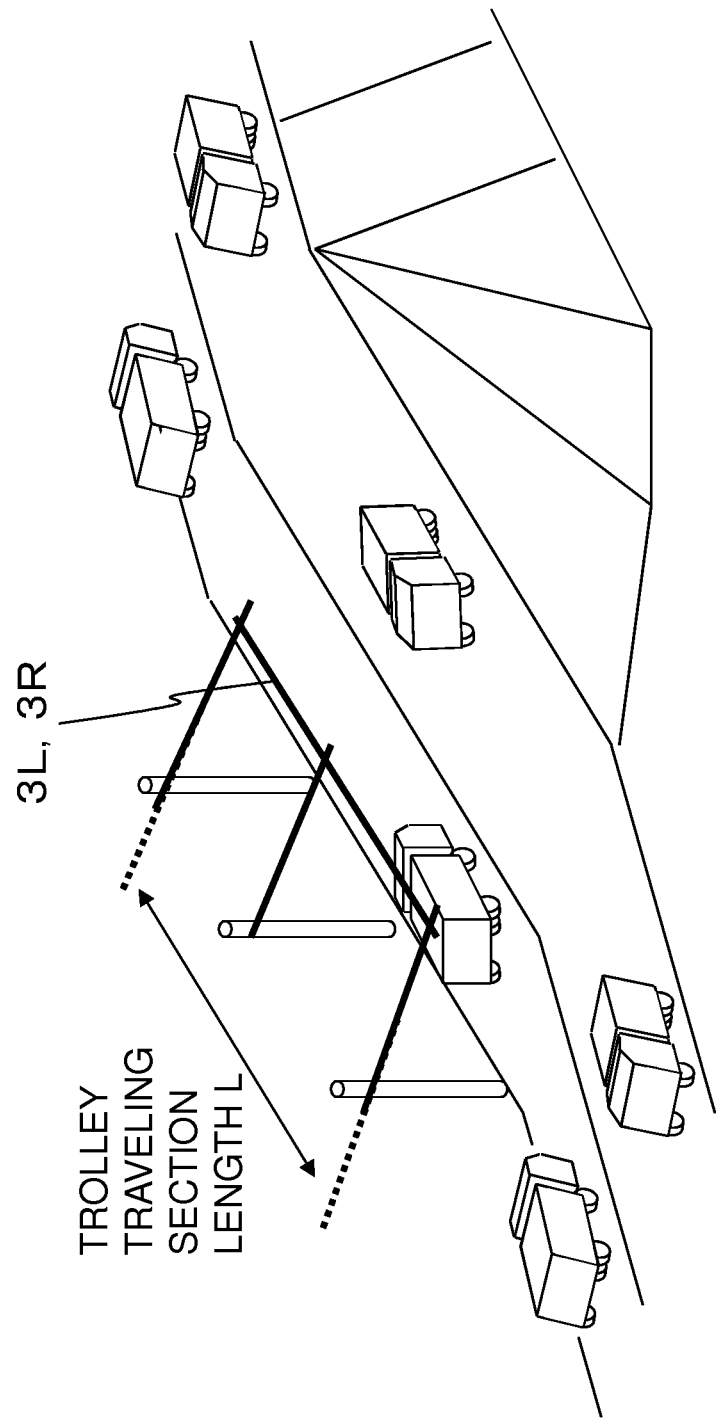
FIG. 40 is a schematic diagram for explaining an example of the operating condition of the electrically driven dump truck.
Figure 41:
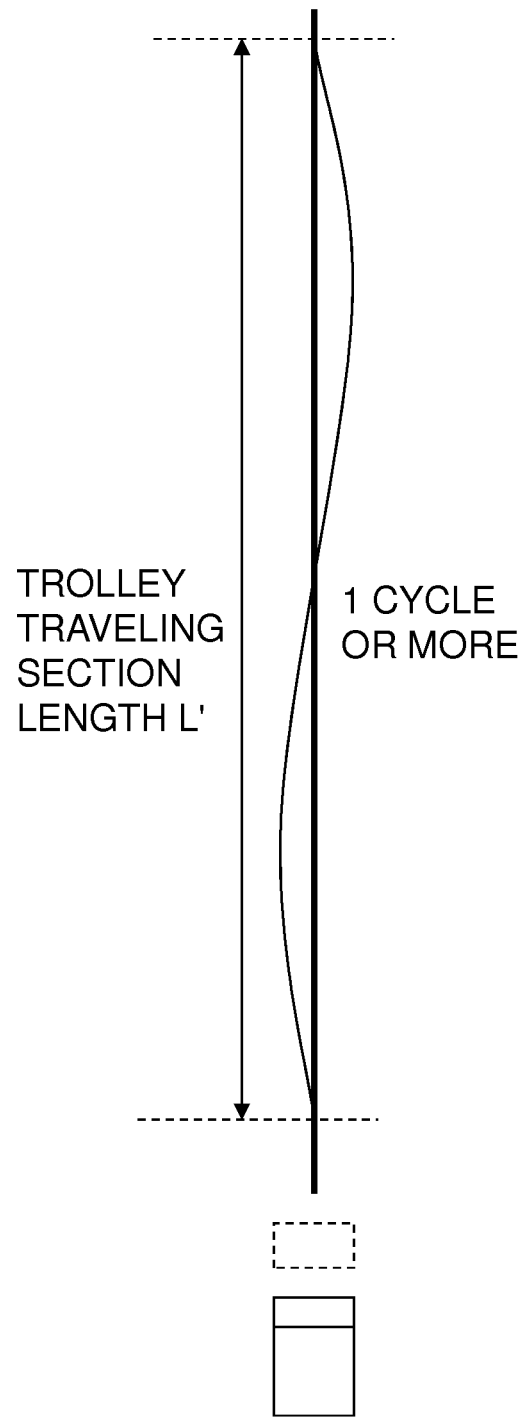
FIG. 41 is a schematic diagram showing an example of the relationship between the length of the section for performing trolley traveling and amplitude.

First, θ in the expression (3) will be explained below. FIG. 40 is a schematic diagram for explaining an example of the operating condition of the electrically driven dump truck. FIG. 41 is a schematic diagram showing an example of desirable relationship between the length of the section for performing trolley traveling and the amplitude.

As shown in FIG. 40, the section in which the trolley wires are installed is generally an upward slope. Thus, even when the vehicle travels by means of trolley traveling in the first half, the vehicle in many cases goes down the downward slope in the second half by means of normal traveling without performing trolley traveling. There can also be cases where the section for performing trolley traveling is a one-way traffic section. In such cases, if the vehicle travels through the trolley traveling section so that the trolley traveling section corresponds to X cycles (X: natural number) as shown in FIG. 41, the trolley wire evenly makes contact with the right-hand side part and the left-hand side part of the slider, by which the uneven wear of the slider can be prevented more reliably. In this case, θ can be represented by the following expression (6):

$$\theta = 2 \times \pi \times (v \times t/L) \times s \quad (6)$$

where "v" represents the vehicle speed, "t" represents the time since the start of the meandering control, and "L" represents the length of the section for performing trolley traveling. With the θ represented as above, the vehicle is allowed to meander for s cycles in the section length L. The cycle s may be increased when the section length L is long. If the cycle s is reduced when the section length L is long, the cycle becomes short and the heat caused by the friction between the slider and the trolley wire becomes concentrated. Therefore, the cycle s is desired to be adjusted to an appropriate value with respect to the section length L.

Figure 42:
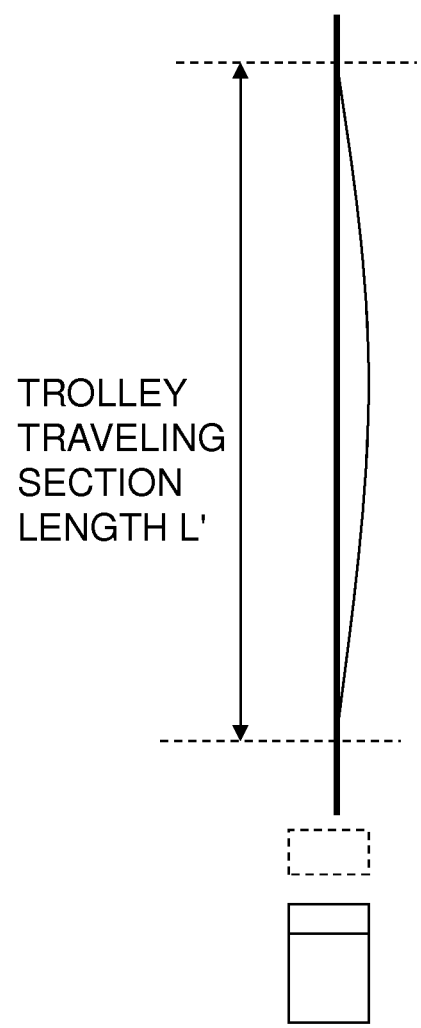
FIG. 42 is a schematic diagram showing another example of the relationship between the length of the section for performing trolley traveling and the amplitude.

In contrast, there are cases where the length of the trolley traveling section is not long enough to include X cycles. For example, when the trolley traveling section is short and does not even include one cycle, the movement of the vehicle does not change rapidly even if a yaw moment is given to the vehicle. Thus, a certain length or more is generally necessary even though the necessary length varies depending on the traveling speed. For example, when the trolley traveling section can be secured only for 0.5 cycles (length: L') as shown in FIG. 42, making the vehicle move simply according to the expression (3) leads to wearing of only one side of the slider since the trolley wire exclusively makes contact with the one side. Incidentally, FIG. 42 is a schematic diagram showing another example of the relationship between the length of the trolley traveling section and the amplitude, and FIG. 43 is a schematic diagram showing another example of desirable relationship between the length of the trolley traveling section and the amplitude.

Figure 43:
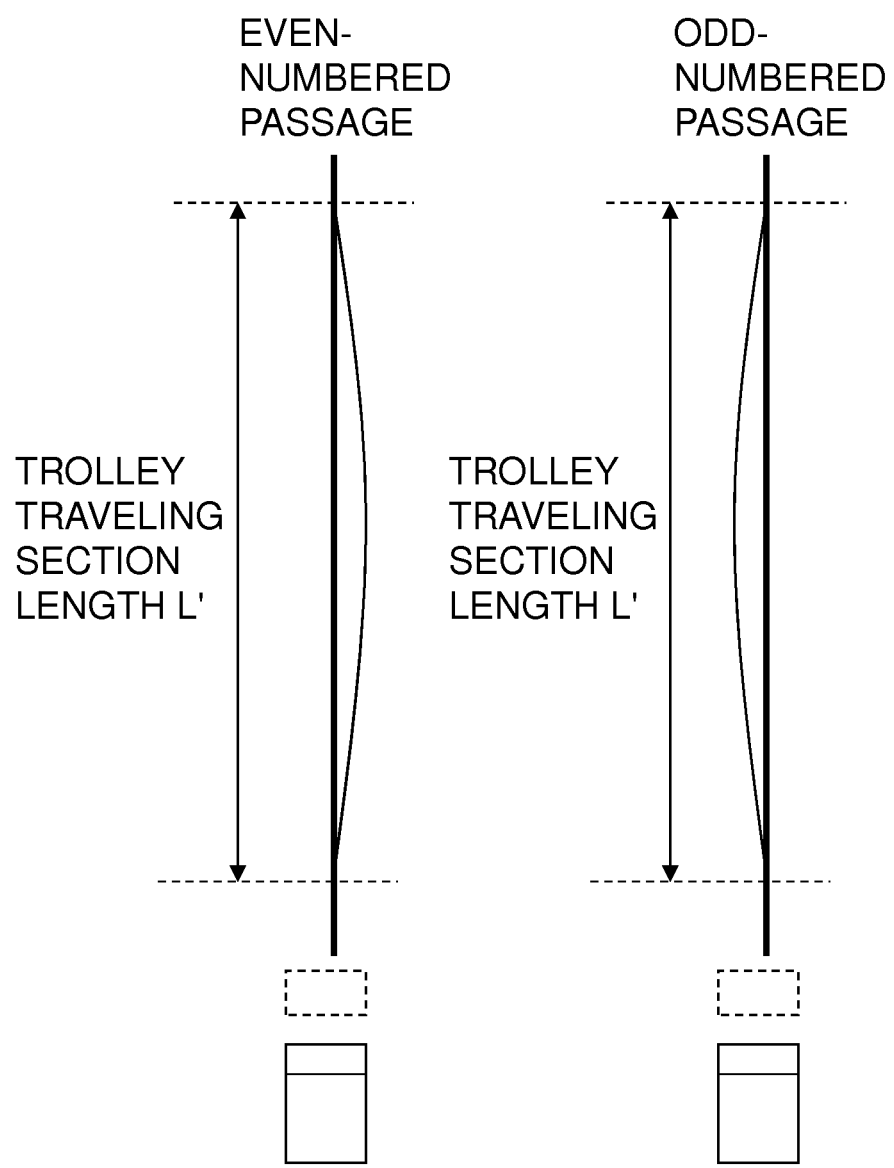
FIG. 43 is a schematic diagram showing another example of the relationship between the length of the section for performing trolley traveling and the amplitude.

Therefore, in cases where the trolley traveling section corresponds to 0.5 cycles as shown in FIG. 43, it is desirable to count the number of times of passing through the trolley traveling section by use of a storage unit installed in the vehicle control device 50, for example, and to alternately change the meandering direction between the even-numbered passage and the odd-numbered passage (i.e., invert the sign of the amplitude j so as to invert the direction of starting the fluctuation) in order to avoid the wearing of only one side of the slider. Thus, let "i" represent the number of times of passing through the trolley traveling section, setting the Y-coordinate Y_c of the fluctuating point F not as the aforementioned expression (3) but as the following expression makes it possible to switch the direction of the amplitude at the start of the meandering control and thereby resolve the problem (uneven wearing of only one side of the slider) with ease and reliability:

$$Y\_c = Y\_Cbc + j \times (-1)^i \times \sin(\theta) \qquad (7)$$

Incidentally, even though there are cases where the trolley traveling section does not end exactly at the end of X cycles in actual traveling, such a difference may be regarded as a permissible error.

Further, by making the fluctuating point F fluctuate for at least 0.5 cycles or more during the traveling through the trolley traveling section, the control for inverting the direction of starting the fluctuation (like the expression (7)) can be carried out even in cases where the control for making the trolley traveling section correspond to X cycles (like the expression (6)) is impossible or the trolley traveling section can only be secured for approximately 0.5 cycles. Consequently, the occurrence of the part of the slider not making contact with the trolley wire can be avoided, evener contact between the slider and the trolley wire can be realized, and the uneven wearing of one side of the slider can be prevented.

<Another Example of Vehicle Meandering Control Starting Trigger>

Concrete examples of the trigger for the above straight traveling section judgment step 303 for judging that the vehicle is traveling in a straight traveling section are not restricted to that shown in the steps 340 and 350. For example, triggers explained below can also be employed.

Figure 44:
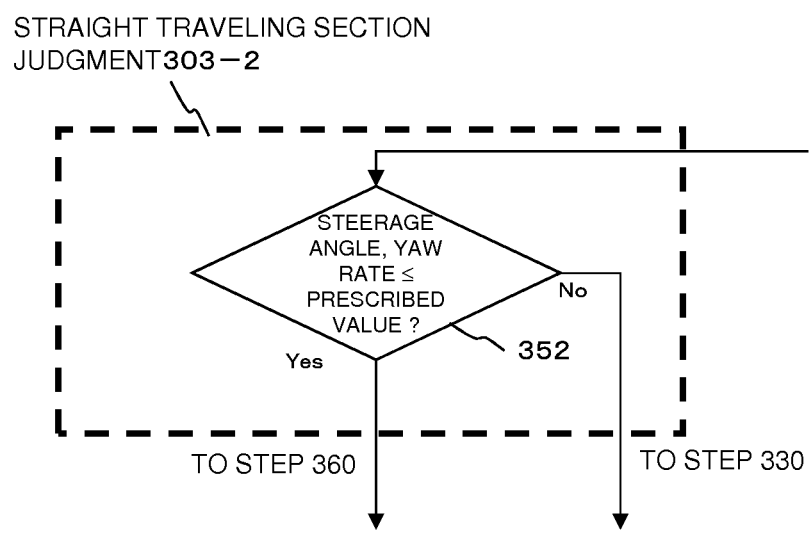
FIG. 44 is a flow chart showing an example of a process flow till the vehicle is judged to be traveling in a straight traveling section in another example of the starting trigger for the vehicle meandering control.

It is possible, for example, to judge that the vehicle is traveling in a straight traveling section when the yaw rate or the steerage angle is a prescribed value or less. FIG. 44 shows a process flow in this case. As shown in FIG. 44, when the target point T is judged to exist between the points A and B in the step 310, a judgment on whether or not the yaw rate or the steerage angle is a prescribed value or less is made in step 352 in a straight traveling section judgment step 303-2. If affirmative (Yes), the process advances to the step 360. If negative (No), the process advances to the step 330.

Figure 45:
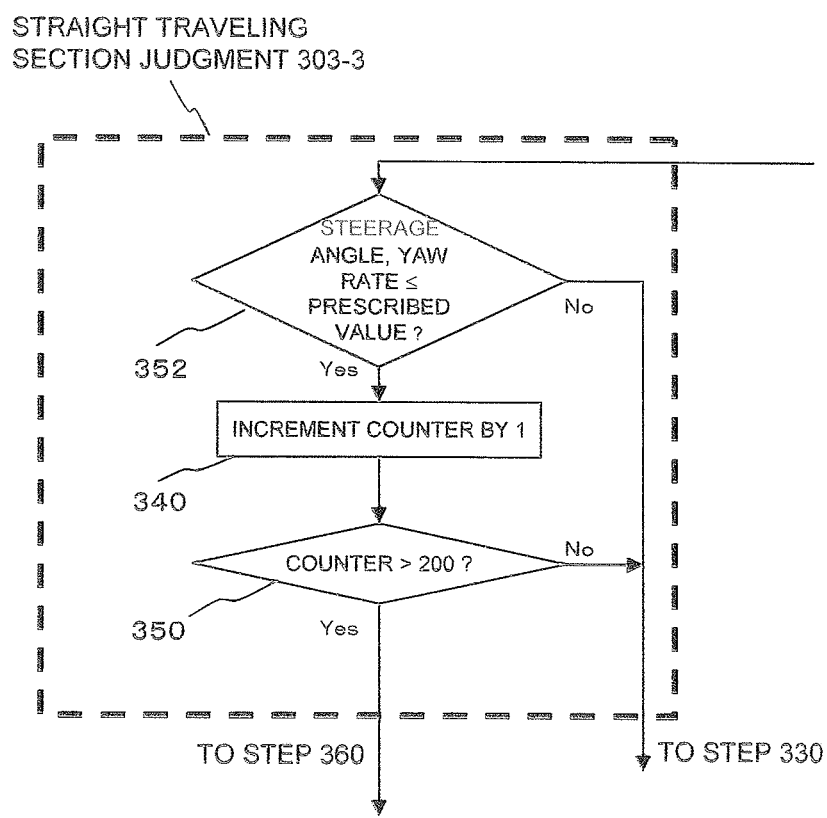
FIG. 45 is a flow chart showing an example of a process flow till the vehicle is judged to be traveling in a straight traveling section in another example of the starting trigger for the vehicle meandering control.

It is also possible, as shown in FIG. 45, to combine steps equivalent to the straight traveling section judgment steps shown in FIGS. 24 and 44 and judge that the vehicle is traveling in a straight traveling section only when both of the conditions are satisfied. FIG. 45 is a flow chart showing another example of the process flow of the trigger for starting the vehicle meandering control. In this case, when the target point T is judged to exist between the points A and B in the step 310, the judgment on whether or not the steerage angle or the yaw rate is a prescribed value or less is made in step 352 in a straight traveling section judgment step 303-3. If affirmative (Yes), the process advances to the step 340. If negative (No), the process advances to the step 330. In the step 340, the counter is incremented by 1 and the process advances to the step 350. In the step 350, whether the counter has reached 200 or not is judged.

<Slider Elevation Control>

Next, the slider elevation control step 400 will be explained below.

As shown in FIGS. 19, 21 and 26, the points C and D are set to specify the permissible range of the Y-coordinate Y_p_t of the point W on the slider 4Ra/4La within which the slider 4Ra/4La is in contact with the trolley wire 3R/3L and satisfactory electric power can be acquired continuously.

In step 410 in FIG. 23, the inclination of the trolley wire 3R/3L is calculated from the target points T and U according to the expression (1). From the inclination and the coordinates of the target point T, the coordinates of the intersection point W of the slider 4Ra/4La and the trolley wire 3R/3L is calculated in step 420. This calculation is performed according to the aforementioned expression (4). In the next step 430, the estimate Y_p_t+1 of the Y-coordinate of the intersection point W in the next step is calculated according to the aforementioned expression (5). In step 440, duration of a state in which the estimate Y_p_t+1 stays in the prescribed range between the points C and D (Y_min≤Y_p_t+1≤Y_max) is measured by use of a counter and whether or not the duration of the state was a prescribed period (e.g., 1 second) or longer is judged.

In step 440, duration of a state in which the estimate Y_p_t+1 stays in the prescribed range between the points C and D (Y_min≤Y_p_t+1≤Y_max) is measured by use of a counter and whether or not the duration of the state was a prescribed period (e.g., 1 second) or longer is judged. If the duration of the state (with the point W existing between the points C and D) was 1 second or longer in the step 440, the process advances to step 450 and the elevation of the sliders 4Ra and 4La is permitted. In this case, it is possible, for example, to inform the driver of the permission of the elevation of the sliders 4Ra and 4La by sound and/or display. In response to a switching operation by the driver, the vehicle control device 50 outputs a command signal for the elevation control and the elevation control device 31 controls the elevation of the sliders 4Ra and 4La according to the command signal. When the sliders 4Ra and 4La have been lowered, it is also possible to automatically elevate the sliders 4Ra and 4La, for example, instead of entrusting the elevating operation to the driver. The vehicle control device 50 outputs the command signal for the elevation control and the elevation control device 31 controls the elevation of the sliders 4Ra and 4La according to the command signal. In this case, it is possible to inform the driver of the automatic elevation of the sliders 4Ra and 4La by sound and/or display, for example.

In contrast, if the duration of the state (with the point W existing in the prescribed range) was less than or equal to 1 second in the step 440, the process advances to step 460 to instruct the driver by sound and/or display to lower the sliders 4Ra and 4La if the sliders have been elevated. The sliders 4Ra and 4La may also be lowered automatically. In this case, it is desirable to inform the driver of the automatic lowering of the sliders 4Ra and 4La by sound and/or display, for example. If the sliders 4Ra and 4La have already been lowered, the elevation of the sliders 4Ra and 4La is prohibited. In this case, it is desirable to inform the driver of the prohibition of the elevation of the sliders 4Ra and 4La by sound and/or display. Also in these cases, the vehicle control device 50 outputs a command signal automatically or in response to the driver's switching operation and the elevation control device 31 controls the lowering of the sliders 4Ra and 4La according to the command signal. This lightens the load on the operator (driver) for elevating and lowering the sliders 4Ra and 4La after the dump truck has entered the trolley traveling section.

While the judgment on whether or not the state (in which the estimate Y_p_t+1 stays between the points C and D (Y_min≤Y_p_t+1≤Y_max) continued for a prescribed period (e.g., 1 second) or longer is made in the step 440 in FIG. 23, it is also possible to immediately advance to the step 450 (without making such a judgment) when the estimate Y_p_t+1 exists between the points C and D (Y_min≤Y_p_t+1≤Y_max) and immediately advance to the step 460 when the estimate Y_p_t+1 does not exist between the points C and D (Y_min≤Y_p_t+1≤Y_max). However, the step 440 is effective for the purpose of preventing the hunting of judgment caused by repeated deviation/reentrance from/to the prescribed range when the Y-coordinate Y_p_t of the point W is unstable due to undulation of the road surface and noise occurring in the image processing.

Figure 46:
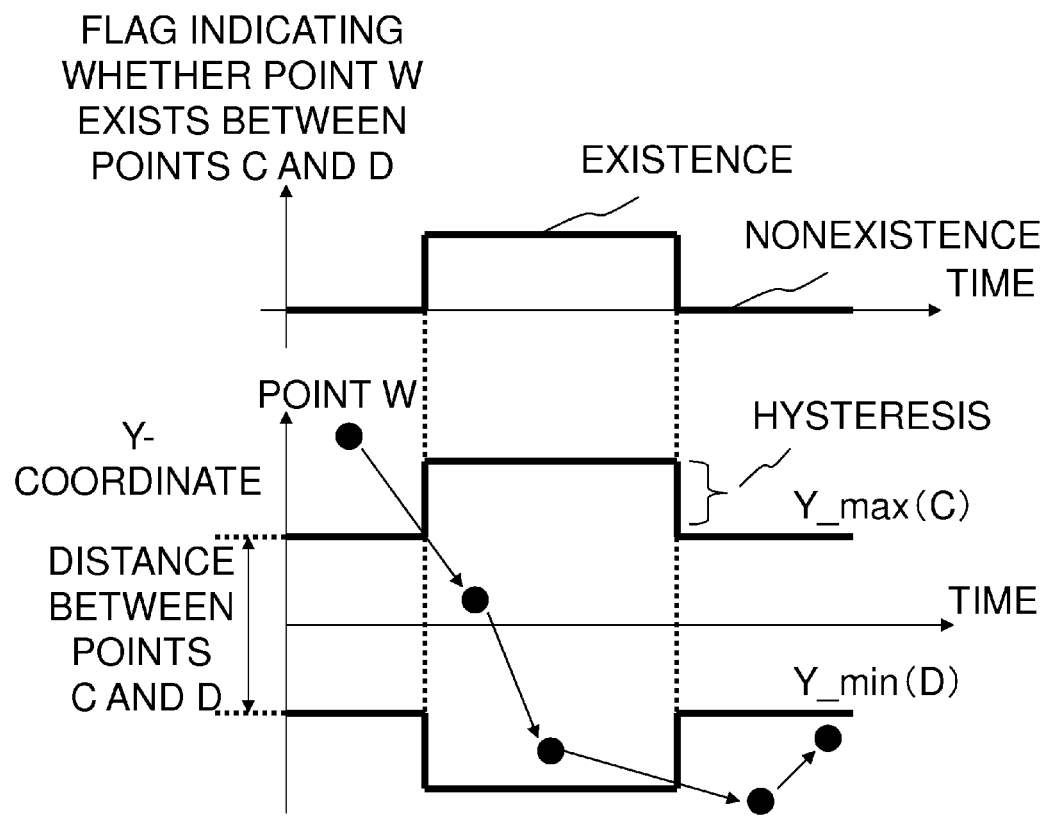
FIG. 46 is a schematic diagram showing a hysteresis process which can be executed instead of a counter process for preventing hunting of judgment.

FIG. 46 is a schematic diagram showing a hysteresis process which can be executed instead of the step 440 employing the counter. As shown in FIG. 46, when the point W exists between the points C and D, the setting of the points C and D is changed to increase the distance between the points C and D. In contrast, when the point W does not exist between the points C and D, the setting of the points C and D is changed to decrease the distance between the points C and D. Also by giving hysteresis to the distance between the points C and D as above, effect similar to that of the counter process (step 440) can be achieved.

<Effect>

According to this embodiment configured as above, the trolley wires 3R and 3L are detected from below and the yaw moment for making the vehicle fluctuate in the direction orthogonal to the traveling direction is given to the vehicle. Since the vehicle travels while meandering around the center of the trolley wires 3R and 3L, the position of the contact point between each slider and the corresponding trolley wire does not concentrate at/around the center of the slider and the driver is allowed to drive the dump truck while easily having the sliders make even contact with the trolley wires without the need of taking special care. Consequently, the uneven wear of the sliders can be prevented without requiring the driver to be careful about the uneven wear and the operating load on the driver can be lightened considerably.

Further, since the trolley wires 3R and 3L are detected from below, there are less factors leading to detection errors compared to conventional techniques detecting lane markers, etc. by capturing images of the ground surface. As a result, the accuracy of the trolley wire detection is improved. By controlling the elevation of the sliders 4Ra and 4La of the power collectors 4R and 4L based on the information detected as above, countermeasures (prohibiting the elevating operation of the sliders 4Ra and 4La, lowering the sliders 4Ra and 4La when the sliders have been elevated, etc.) can be taken even when the central position of a slider 4Ra/4La of the traveling vehicle has deviated widely from the trolley wire 3R/3L in the lateral direction. Consequently, the operating load on the driver during the trolley traveling can be lightened considerably.

Furthermore, thanks to the improvement of the trolley wire detection accuracy, the control accuracy of the yaw moment control for making the vehicle travel while meandering around the center of the trolley wires 3R and 3L or tracing the trolley wires 3R and 3L is improved. Consequently, the central position of each slider 4Ra/4La of the traveling vehicle hardly deviates widely from the trolley wire 3R/3L in the lateral direction. Also from this viewpoint, the operating load on the driver in the trolley traveling section can be lightened considerably.

In the case where a camera 15 is used as the trolley wire detecting device, illuminating the trolley wires 3R and 3L with the illuminating device 51 is effective for maintaining high contrast between the sky and the trolley wires 3R and 3L. By use of the illuminating device 51, the yaw moment control for making the vehicle travel while meandering around the center of the trolley wires 3R and 3L or tracing the trolley wires 3R and 3L can be executed with high accuracy not only in the daytime with fine weather but also in conditions in which such high contrast between the sky and the trolley wires 3R and 3L is hardly achieved (evening, nighttime, rainy weather, etc.).

Moreover, the control device 200 is capable of executing the yaw moment control by using the vehicle control device 50 and the controller 100 as separate components. With this configuration, even when the controller 100 is an already-existing controller, the yaw moment control in accordance with the present invention can be carried out by just adding the vehicle control device 50 to the controller. The parameters of the yaw moment control can be adjusted just by changing the functions of the vehicle control device 50. Consequently, high flexibility can be given to the control system.

Other Examples

Figure 47:
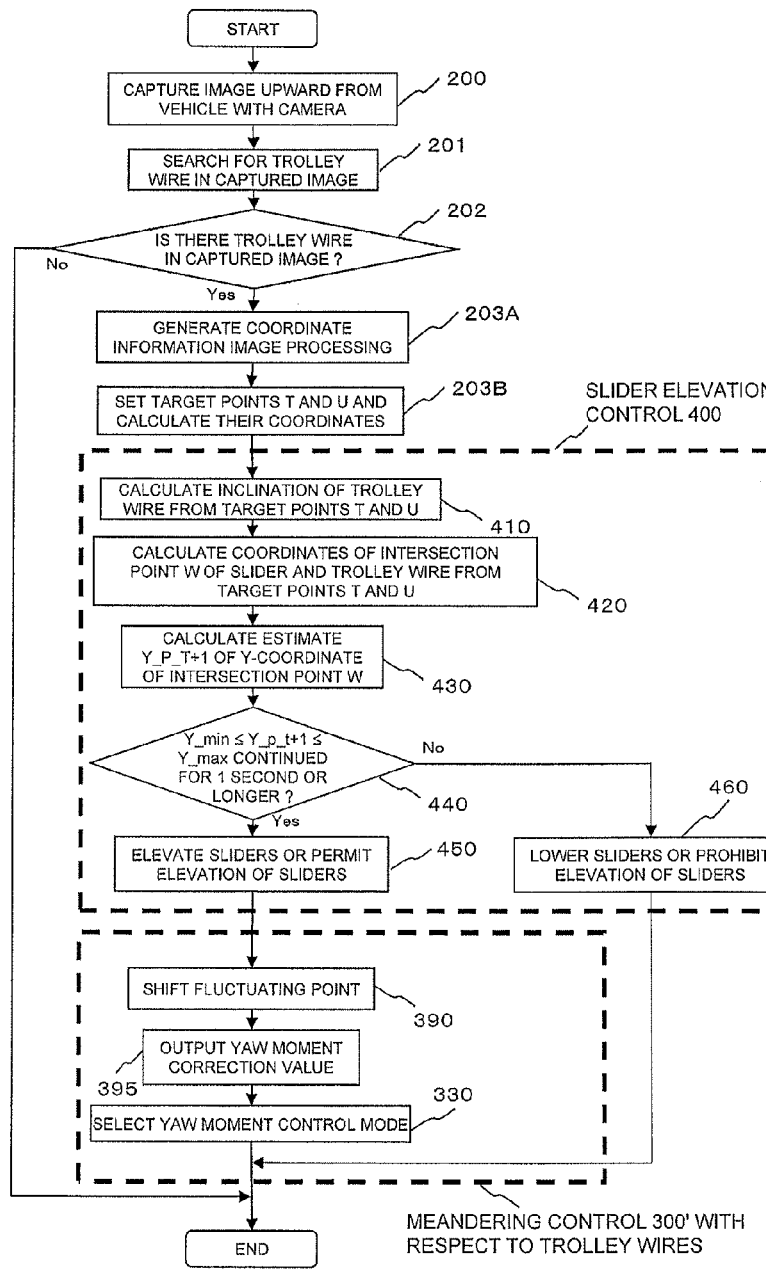
FIG. 47 is a flow chart showing an example of a process flow from the upward shooting with the camera to the control output in another embodiment of the vehicle control device.

While the vehicle meandering control for making the vehicle travel while meandering around the trolley wires is executed only when the target point T exists in the dead zone (between the points A and B) as shown in FIGS. 21, 23 and 24 in the examples described in this embodiment, it is not absolutely necessary to restrict the execution of the vehicle meandering control step between the zone AB. Even when no dead zone is set and no trolley wire tracing control is carried out, it is possible to set the fluctuating point F with respect to the target point T according to the expression (3) or (7), calculate the yaw moment correction value so as to make the representative point Z coincide with the fluctuating point F, and control the vehicle according to the yaw moment correction value. Even in this case, the vehicle eventually travels while meandering around the center of the trolley wires. FIG. 47 shows an example of the control flow in this case.

The flow in FIG. 47 to the step 203B is identical with that in FIG. 23. The process advances from the step 203B to the slider elevation control 400. After the step 450 in the slider elevation control 400, the process advances to the step 390 of the meandering control step 300' (with respect to the trolley wires) while holding the sliders in the elevated state. In the step 390, the vehicle state quantity calculation unit 50b sets the fluctuating point F for the vehicle meandering control according to the expression (3) or (7) and outputs the coordinate value of the fluctuating point F. Thereafter, the process advances to the step 395. In the step 395, the vehicle state quantity control unit 50c calculates and outputs the yaw moment correction value according to the expression (2) so as to make the fluctuating point F and the representative point Z coincide with each other.

Also with this control flow, the vehicle eventually travels while meandering around and tracing the trolley wires. Incidentally, when the judgment in the step 440 is negative (No) and the process advances to the step 460, the section in which the vehicle is traveling is judged not to be a trolley traveling section and the process is ended.

It is also possible to add a process corresponding to the straight traveling section judgment step, like the one shown in FIG. 44, to the process shown in FIG. 47. In this case, the steering wheel is supposed to be operated by the driver, and thus it is possible to measure the steering angle instead of the steerage angle and judge whether or not the yaw rate or the steering angle is a prescribed value or less by performing a process equivalent to the step 352.

Figure 48:
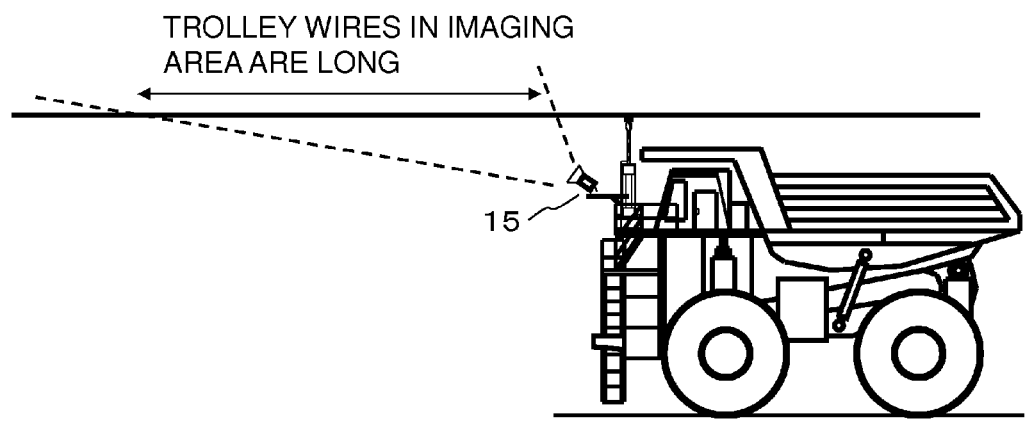
FIG. 48 is a schematic diagram similar to FIG. 12, showing an example in which the shooting direction of the camera is shifted forward.

While the camera used as the trolley wire detecting device was pointed directly upward in the above embodiment, the camera may also be set to capture images in a forward and upward direction from the vehicle as shown in FIG. 48. Such camera setting facilitates the detection/recognition of the trolley wires as the target of the tracing since the parts of the trolley wires shot with the camera in the vehicle's traveling direction are long. On the other hand, noise caused by the scenery included in the imaging area increases as the imaging area is shifted forward. Therefore, the imaging area of the camera may be adjusted properly depending on the environment in which the present invention is employed.

DESCRIPTION OF REFERENCE NUMERALS 1 vehicle
2 vessel
3L, 3R trolley wire
4L, 4R power collector
4La, 4Ra slider
4a hydraulic piston device
4b hydraulic piston
4c rod
4d hydraulic line
4e hydraulic device
4f insulator
4g electric wire
4h elevation command signal
5L, 5R rear wheel
6L, 6R electric motor
6La, 6Ra output shaft
7L, 7R decelerator
11 accelerator pedal
12 retarder pedal
13 shift lever
14 combined sensor
15 camera
16L, 16R electromagnetic pickup sensor for rear wheel
21 engine
21a electronic governor
22 AC generator
23 rectifier circuit
24 sensing resistor
25 capacitor
26 chopper circuit
27 grid resistor
28 other engine load
30 inverter control device
30a torque command calculation unit
30b motor control calculation unit
30c inverter (switching element)
31 elevation control device
32 steering control device
32a conversion unit
32b calculation unit
32c conversion unit
32d calculation unit
35L, 35R front wheel
36L, 36R electromagnetic pickup sensor for front wheel
37 ground speed sensor
40 steering device
41 steering wheel
42 reaction force motor having a steering angle sensor
43 steerage motor having a steerage angle sensor
44 rack-and-pinion gear
45L, 45R front wheel
50 vehicle control device
50a image information processing unit
50b vehicle state quantity calculation unit
50c vehicle state quantity control unit
$50c_1$ calculation unit
$50c_2$ conversion unit
$50c_3$ conversion unit
$50c_4$ conversion unit
51 illuminating device
52 insulator
53 support
100 controller
100a processing unit
100b calculation unit
101 vehicle speed control unit
101a calculation unit
101b conversion unit
101c switch unit
101d zero output unit
102 yaw moment control unit
102a calculation unit
102b steering torque control unit
102c motor torque control unit
102d optimum distribution control unit
102e switch unit
200 control device
P, Q, R, S target point
P', Q', R', S' representative point
T target point
Z representative point (control point)
F fluctuating point
e_Lad deviation
θ_L inclination
Y_Cbc deviation
θ_t inclination
Y_l, Y_r Y-coordinate value of point A, B (first threshold value)
Y_l', Y_r' Y-coordinate value of point A', B' (second threshold value)

The invention claimed is:

1. An electrically driven dump truck which elevates a slider (4Ra, 4La) of a power collector (4R, 4L) provided on a vehicle (1) to be movable up and down, places the slider in contact with a trolley wire installed along a lane, and travels by use of electric power received from the trolley wire, comprising:

right and left electric motors (6R, 6L) for traveling;
a steering device (40);
a trolley wire detecting device (15) which is provided on the vehicle and detects the trolley wire from below when the electrically driven dump truck is traveling; and
a control device (200) which executes control to give a yaw moment to the vehicle so as to make the vehicle travel while meandering around the trolley wire based on relative position information on the electrically driven dump truck and the trolley wire detected by the trolley wire detecting device, wherein:

the control device calculates at least one representative point of the vehicle and at least one target point situated on the trolley wire based on the relative position information on the electrically driven dump truck and the trolley wire detected by the trolley wire detecting device, sets a fluctuating point which fluctuates with reference to the target point, and executes control to give a yaw moment to the vehicle in such a manner that the representative point approaches the fluctuating point, the control device includes a vehicle control device (50), a controller (100), an inverter control device (30) and a steering control device (32), the vehicle control device calculates a yaw moment correction value for giving the yaw moment to the vehicle in such a manner that the representative point approaches the fluctuating point, and the controller controls at least either the right and left electric motors or the steering device by use of the inverter control device and the steering control device based on the yaw moment correction value for giving the yaw moment to the vehicle so as to make the vehicle travel while meandering around the trolley wire.

2. The electrically driven dump truck according to claim 1, further comprising a vehicle speed detecting device which measures speed of the vehicle, wherein the control device makes the fluctuating point periodically fluctuate at a certain cycle determined according to at least either a previously memorized distance of a section for performing trolley traveling or the vehicle speed measured by the vehicle speed detecting device.

3. The electrically driven dump truck according to claim 2, wherein the control device makes the fluctuating point periodically fluctuate at a certain cycle determined according to one selected from a sinusoidal wave function, a trapezoidal wave function and a triangular wave function corresponding to at least either the trolley traveling section distance or the vehicle speed.

4. The electrically driven dump truck according to claim 2, wherein the control device in the control for making the fluctuating point periodically fluctuate makes the fluctuating point fluctuate for at least a half cycle or more during the traveling of the electrically driven dump truck through the trolley traveling section.

5. The electrically driven dump truck according to claim 1, further comprising:

an angle sensor which measures at least either a steering angle of a steering wheel operated by a driver or a steerage angle of tires; and a yaw rate detecting device (14) which measures a yaw rate of the vehicle, wherein:

the control device judges whether the vehicle is traveling in a straight traveling section or not based on whether or not the steering angle or the steerage angle measured by the angle sensor or the yaw rate measured by the yaw rate detecting device remains not more than a prescribed value for a prescribed time period, and the control device sets the fluctuating point when the vehicle is judged to be traveling in the straight traveling section.

6. The electrically driven dump truck according to claim 1, wherein the control device memorizes the number of times of traveling through the trolley traveling section and inverts the direction of the fluctuation of the fluctuating point upon each traveling through the trolley traveling section based on the number of times of traveling.

7. The electrically driven dump truck according to claim 1, wherein the trolley wire detecting device includes:

a camera (15) which is provided on the vehicle and continuously captures images of the trolley wire when the dump truck is traveling; and an illuminating device (51) which is provided on the vehicle and illuminates the trolley wire.

* * * * *